(12) United States Patent
Watanabe

(10) Patent No.: US 10,033,060 B2
(45) Date of Patent: Jul. 24, 2018

(54) MANUFACTURING METHOD OF FUEL CELL AND GAS SEPARATOR FOR FUEL CELL

(71) Applicant: TOYOTA JIDOSHA KABUSHIKI KAISHA, Toyota-shi, Aichi-ken (JP)

(72) Inventor: Kazuhiro Watanabe, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 268 days.

(21) Appl. No.: 14/609,490

(22) Filed: Jan. 30, 2015

(65) Prior Publication Data

US 2015/0221971 A1    Aug. 6, 2015

(30) Foreign Application Priority Data

Feb. 5, 2014 (JP) .................................. 2014-020053
Jan. 9, 2015 (JP) .................................. 2015-002942

(51) Int. Cl.
*H01M 8/24* (2016.01)
*H01M 8/02* (2016.01)
(Continued)

(52) U.S. Cl.
CPC ......... *H01M 8/247* (2013.01); *H01M 8/0204* (2013.01); *H01M 8/0247* (2013.01);
(Continued)

(58) Field of Classification Search
CPC ............. H01M 8/0254; H01M 8/0204; H01M 8/0247; H01M 8/242
See application file for complete search history.

(56) References Cited

U.S. PATENT DOCUMENTS

2005/0064266 A1* 3/2005 Abdou ................ H01M 8/249
   429/457
2008/0268316 A1  10/2008 Park et al.
(Continued)

FOREIGN PATENT DOCUMENTS

DE  20 2012 004 926   10/2013
EP         1 988 594   11/2008
(Continued)

*Primary Examiner* — Osei K Amponsah
(74) *Attorney, Agent, or Firm* — Finnegan, Henderson, Farabow, Garrett & Dunner, LLP

(57) ABSTRACT

There is a need to improve the positioning accuracy in stacking gas separators. A guide section 58 provided in a fuel cell manufacturing apparatus 50 has first and second guide members 52 arranged to be parallel to each other and away from each other in a horizontal direction and extended in a stacking direction of the gas separators. The gas separator has first and second engagement elements 28 provided at corresponding positions to the first and the second guide members 52 to have a concave and/or convex shape formed along its outer periphery. A manufacturing method of a fuel cell includes a stacking step of stacking a plurality of members including gas separators by engaging the first engagement element with the first guide member and engaging the second engagement element with the second guide member. The gas separators stacked by the stacking step satisfy such a configuration that a first support location of the first engagement element and a second support location of the second engagement element are arranged at positions away from each other across a center of gravity of the gas separator and that the center of gravity is located in a lower area in a direction of gravity below a straight line of connecting the first support location with the second support location on a stacking surface of the gas separator.

5 Claims, 18 Drawing Sheets

(51) Int. Cl.
*H01M 8/247* (2016.01)
*H01M 8/2483* (2016.01)
*H01M 8/0254* (2016.01)
*H01M 8/242* (2016.01)
*H01M 8/0204* (2016.01)
*H01M 8/0247* (2016.01)
*H01M 8/1018* (2016.01)

(52) U.S. Cl.
CPC ......... *H01M 8/0254* (2013.01); *H01M 8/242* (2013.01); *H01M 8/2483* (2016.02); *H01M 2008/1095* (2013.01); *Y02P 70/56* (2015.11)

(56) References Cited

U.S. PATENT DOCUMENTS

| | | |
|---|---|---|
| 2009/0068540 A1 | 3/2009 | Hayashi et al. |
| 2015/0136589 A1 | 5/2015 | Gehring et al. |

FOREIGN PATENT DOCUMENTS

| | | | | |
|---|---|---|---|---|
| JP | 2003-197250 | * | 7/2003 | ............ H01M 8/24 8/10 |
| JP | 2007-066573 | * | 3/2007 | ............ H01M 8/24 |
| JP | 2007-66573 | | 3/2007 | |
| JP | 2007-242487 | | 9/2007 | |
| JP | 2008-123760 | | 5/2008 | |
| JP | 2013-211240 A | | 10/2013 | |
| KR | 10-0821039 B1 | | 4/2008 | |

\* cited by examiner

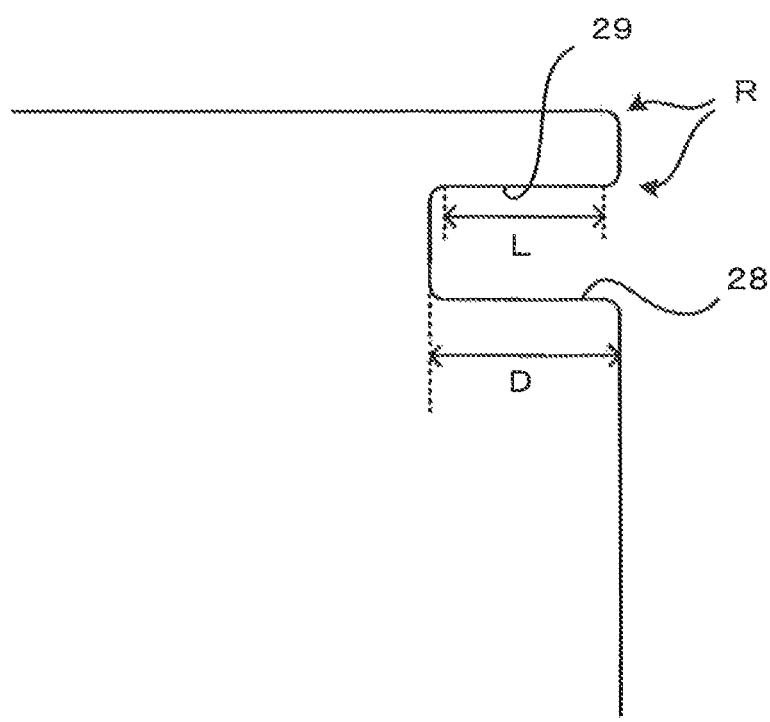

MANUFACTURING METHOD OF FUEL CELL AND GAS SEPARATOR FOR FUEL CELL

CROSS-REFERENCE TO RELATED APPLICATION

The present application claims priority from Japanese patent application Nos. P2014-20053 filed on Feb. 5, 2014, and 2015-002942, filed Jan. 9, 2015, the entirety of disclosure of which is hereby incorporated by reference into this application.

TECHNICAL FIELD

The present invention relates to a manufacturing method of a fuel cell and a gas separator for a fuel cell.

DESCRIPTION OF RELATED ART

A fuel cell is generally formed by stacking a plurality of unit cells, each including an electrolyte layer, a pair of electrodes placed across the electrolyte layer and a pair of gas separators placed outside of the respective electrodes. In assembly of the fuel cell, these respective members are sequentially stacked while being positioned. The stacking operation may first position and integrate the electrolyte layer and the electrodes having low rigidity with the gas separators having relatively high rigidity and subsequently position the gas separators.

For example, one proposed method of positioning and stacking gas separators provides engagement elements at centers of both an upper side and a lower side of each gas separator in an approximately rectangular shape and provides two parallel positioning frames extended in the stacking direction of the gas separators in a fuel cell manufacturing apparatus to be arranged away from each other in the direction of gravity by a distance between the two engagement elements, where the stacking direction is perpendicular to the direction of gravity (for example, JP 2008-123760A). In this configuration, the engagement elements at the upper side and at the lower side of the gas separators are engaged with the two positioning frames. The gas separators are suspended by the engagement elements at the respective upper sides thereof and are stacked in the state that the engagement elements at the respective lower sides of the gas separators come into contact with the positioning frames.

Another proposed stacking method provides a plurality of positioning holes at specific positions in the neighborhood of the periphery of each gas separator and provides a plurality of parallel positioning shafts extended in the vertical direction in a fuel cell manufacturing apparatus to be arranged at positions corresponding to the positions of the plurality of positioning holes (for example, JP 2007-242487A). In this configuration, the gas separators are stacked in the vertical direction by the positioning shafts passing through the corresponding positioning holes.

SUMMARY

In the configuration that the gas separators are suspended at the respective upper sides of the gas separators, however, the gas separators are likely to swing relatively easily about the engagement element, due to a clearance inevitably formed between the engagement element and the positioning frame for the fitting operation of the gas separator. In the configuration that the gas separators are stacked by the positioning shafts passing through the corresponding positioning holes of the gas separator, the gas separators are likely to be relatively easily shifted in the planar direction of the gas separators, due to a clearance inevitably formed between the positioning hole and the positioning shaft for the fitting operation of the gas separators. There is accordingly a need to further improve the positioning accuracy in the course of stacking.

In the configuration of stacking the gas separators by the positioning shafts passing through the corresponding positioning holes, one possible measure to enhance the positioning accuracy increases the number of the positioning holes and the number of the positioning shafts. This method, however, needs to further increase the accuracy of formation of the positioning holes and the positioning shafts and is likely to complicate the operation for stacking. This method may thus not be appropriately employed in some cases.

The invention may be implemented by any of the following aspects, in order to solve at least part of the above problems.

(1) According to one aspect, there is provided a manufacturing method of a fuel cell by stacking a plurality of members including gas separators while sequentially engaging the gas separators with a guide section provided in a fuel cell manufacturing apparatus. The guide section comprises a first guide member and a second guide member arranged to be parallel to each other and away from each other in a horizontal direction and extended in a stacking direction of the plurality of members including the gas separator, which is perpendicular to the horizontal direction and a direction of gravity. The gas separator has a first engagement element and a second engagement element provided at corresponding positions to the first guide member and the second guide member, each engagement element having a concave and/or convex shape formed along outer periphery of the gas separator. The manufacturing method comprises a stacking step of stacking the plurality of members including the gas separators through engagement of the gas separators with the fuel cell manufacturing apparatus by engaging the first engagement element with the first guide member and engaging the second engagement element with the second guide member. The plurality of members stacked by the stacking step satisfy such a configuration that a first support location of the first engagement element and a second support location of the second engagement element supported by the first guide member and the second guide member are arranged at positions away from each other across a center of gravity of the gas separator and that the center of gravity is located in a lower area in the direction of gravity below a straight line of connecting the first support location with the second support location on a stacking surface of the gas separator.

In the manufacturing method of the fuel cell according to this aspect, the gas separators are stacked, while being suspended through engagement of the first and the second engagement elements of the gas separator with the first and the second guide members extended in the stacking direction. This configuration takes advantage of the gravitational force to keep the respective gas separators parallel to the direction of gravity and facilitates positioning and stacking of the respective gas separators with high accuracy. More specifically, the first support location and the second support location are arranged above the center of gravity of the gas separator in the direction of gravity to be away from each other in the horizontal direction across the center of gravity when the gas separators are arranged in the orientation of stacking. This suppresses the gas separator from being swung about the engagement element and thereby suppresses the gas separators from being shifted in the direction of rotation during stacking. Additionally, stacking the gas separators in the suspended state does not cause the gravitational force to act in the stacking direction and accordingly does not increase the contact pressure in the respective gas separators due to the gravitational force This configuration thus relatively facilitates the operation of compensating for the layer misalignment of the previously stacked gas separators.

(2) In the manufacturing method of the fuel cell of the above aspect, the first support location and the second support location may be arranged above the center of gravity of the gas separator in the direction of gravity. The manufacturing method of the fuel cell of this aspect enables the gas separators to be suspended more stably when the gas separators are stacked.

(3) In the manufacturing method of the fuel cell of the above aspect, the first support location and the second support location may have different distances in the direction of gravity from the center of gravity when the first engagement element and the second engagement element are respectively engaged with the first guide member and the second guide member. The manufacturing method of the fuel cell of this aspect enhances the discrimination of the orientation (front surface or rear surface) of the gas separator in the process of stacking the gas separators and thereby improves the workability in stacking the gas separators.

(4) In the manufacturing method of the fuel cell of the above aspect, the stacking step may comprise: arranging the first support location above the second support location in the direction of gravity; and engaging the first engagement element with the first guide member and engaging the second engagement element with the second guide member, such that at least either a first support area of the first engagement element and a second support area of the second engagement element, which are areas supportable by the first guide member and the second guide member, or a first contact area of the first guide member and a second contact area of the second guide member, which are areas allowed to be in contact with the first engagement element and the second engagement element, form sloped surfaces that are inclined downward in the direction of gravity from a first engagement element side toward a second engagement element side.

The manufacturing method of the fuel cell of this aspect enhances the accuracy of positioning in the horizontal direction when the gas separators are stacked.

(5) In the manufacturing method of the fuel cell of the above aspect, the stacking step may comprise engaging the first engagement element with the first guide member and engaging the second engagement element with the second guide member, such that the gas separator is positioned relative to the first guide member at the first engagement element. The manufacturing method of the fuel cell of this aspect enhances the effect of keeping the stacking surface of the separators parallel to one another when the gas separators are stacked.

(6) In the manufacturing method of the fuel cell of the above aspect, the guide section may comprise vibration generators configured to generate vibration in the first guide member and the second guide member, in order to suppress the first engagement element from being in close contact with the first guide member and suppress the second engagement element from being in close contact with the second guide member, and the stacking step may be performed, while the vibration is generated in the guide members by the vibration generators. This configuration suppresses the gas separator from being damaged by friction between the gas separators and the first and the second guide members.

(7) According to another aspect of the invention, there is provided a gas separator for fuel cell. The gas separator for fuel cell comprises a first engagement element and a second engagement element, each having a concave and/or convex shape formed along outer periphery of the gas separator. The first engagement element and the second engagement element are provided at positions to suspend the gas separator in a first state that a stacking surface of the gas separator is parallel to a direction of gravity. In the first state, a center of gravity of the gas separator is located in a lower area in the direction of gravity below a straight line of connecting a first arbitrary point on a first support area of the first engagement element which is allowed to be in contact with another member for suspending with a second arbitrary point on a second support area of the second engagement element which is allowed to be in contact with another member for suspending, on the stacking surface of the gas separator. In the first state, the first support area and the second support area are arranged to be away from each other in a horizontal direction across the center of gravity.

In the gas separator for fuel cell according to this aspect, the first engagement element and the second engagement element are respectively engaged with specific guide members which are extended in the stacking direction and arranged at a positional relationship corresponding to the positional relationship between the first and the second engagement elements. The gas separator is then suspended such that the stacking surface of the gas separator is parallel to the direction of gravity. This facilitates positioning and stacking of the gas separators with high accuracy. Stacking a plurality of members including such gas separators relatively facilitates the operation of compensating for the layer misalignment of the previously stacked gas separators.

The invention may be implemented by any of various aspects other than those described above, for example, a fuel cell manufactured by the manufacturing method of the fuel cell, a stacking method of gas separators for fuel cell, a conveying method of gas separators for fuel cell, a stacking method of unit cells and a conveying method of unit cells.

BRIEF DESCRIPTION OF DRAWINGS

FIG. 11 is an enlarged view illustrating the neighborhood of the engagement element;

DESCRIPTION OF EMBODIMENTS

A. General Configuration of Fuel Cell

Figure 1:
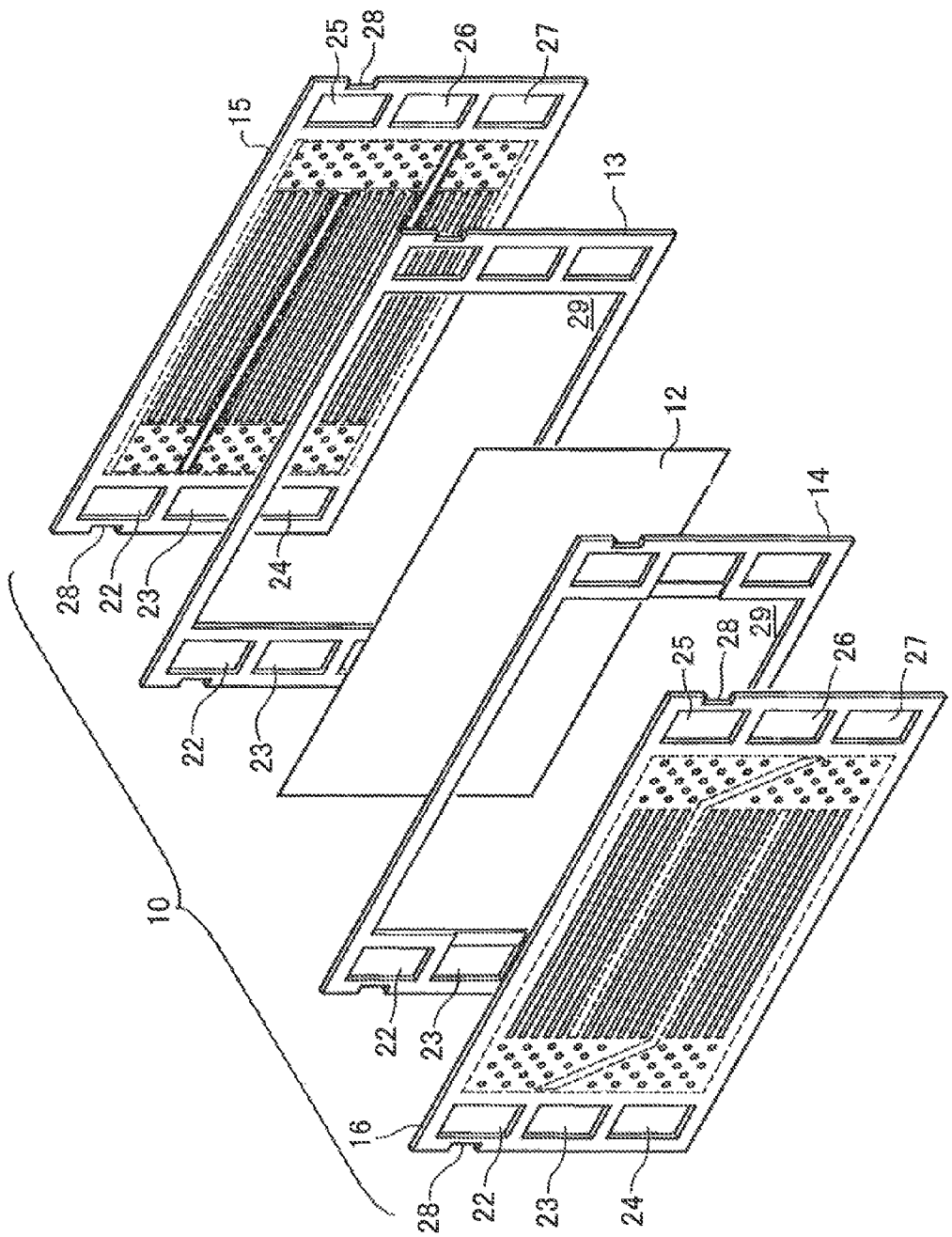
FIG. 1 is an exploded perspective view illustrating the general configuration of a unit cell.
Figure 2:
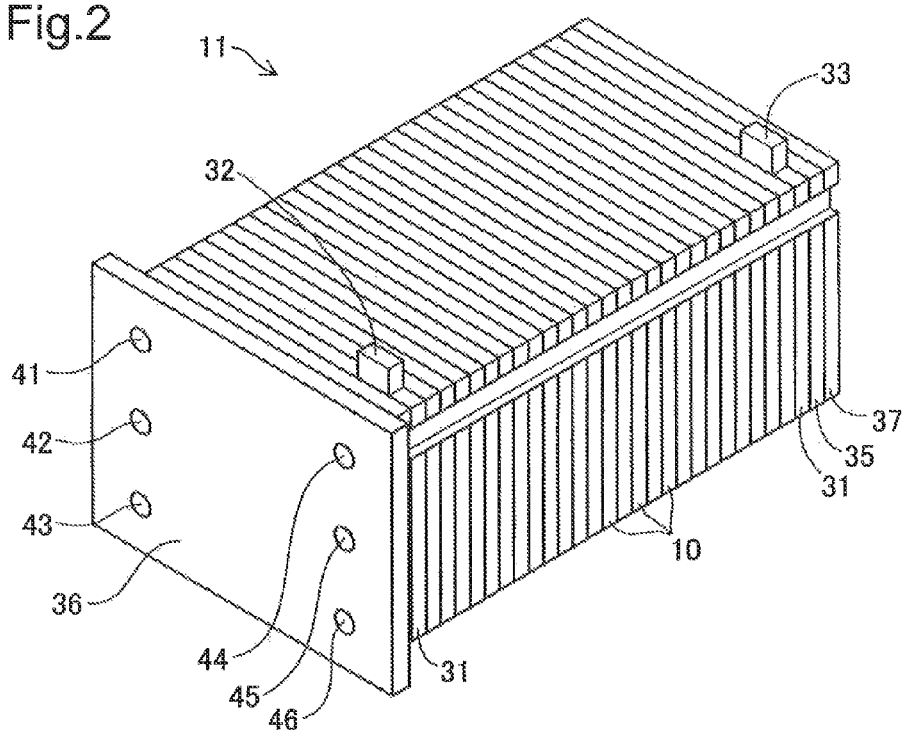
FIG. 2 is a perspective view illustrating the appearance of a fuel cell stack.

FIG. 1 is an exploded perspective view illustrating the general configuration of a unit cell 10 constituting a fuel cell according to one preferable embodiment of the invention. FIG. 2 is a perspective view illustrating the appearance of a fuel cell stack 11 produced by stacking the unit cells 10.

The unit cell 10 includes a power generation assembly 12, a set of resin frames 13 and 14 arranged to surround the outer periphery of the power generation assembly 12 and place the power generation assembly 12 therebetween, and a set of gas separators 15 and 16 arranged to place the power generation assembly 12 supported by the resin frames 13 and 14 therebetween.

The power generation assembly 12 includes an electrolyte membrane and electrodes formed on the electrolyte membrane. The fuel cell of this embodiment is a polymer electrolyte fuel cell, and the electrolyte membrane is formed from a proton-conductive ion exchange membrane made of a solid polymer material, for example, a fluororesin. The electrodes, i.e., anode and cathode, contain, for example, platinum or a platinum alloy as a catalyst and are formed by supporting such a catalyst on a carrier having electrical conductivity. More specifically, the anode and the cathode are formed by applying an electrode ink, which contains, for example, carbon particles having the above catalyst supported thereon and an electrolyte similar to the polymer electrolyte of the electrolyte membrane, on the electrolyte membrane. The power generation assembly 12 of this embodiment further has gas diffusion layers which are placed on the respective electrodes and are made of a porous material having electrical conductivity, such as carbon paper.

The gas separators 15 and 16 are metal thin plate members in an approximately rectangular shape and have concave-convex shapes formed on their respective surfaces by pressing and holes provided at predefined positions. Such concave-convex shapes form inner-cell gas flow paths between the gas separator 15 and the power generation assembly 12 and between the gas separator 16 and the power generation assembly 12 to respectively make a flow of a reactive gas (hydrogen-containing fuel gas or oxygen-containing oxidizing gas). An inter-cell coolant flow path serving as a flow path for a cooling medium is formed by the concave-convex shape of the gas separator 15 included in one unit cell and the concave-convex shape of the gas separator 16 included in another adjacent unit cell.

The resin frames 13 and 14 are made of an insulating resin and have openings 29 in an approximately rectangular shape formed such as to substantially overlap with the specific areas of the gas separators 15 and 16 having the concave-convex shapes provided to form the inner-cell gas flow paths. The resin frames 13 and 14 are placed between the power generation assembly 12 and the gas separators 15 and 16 having the concaves and convexes of specified heights and serve as spacers to ensure the spaces for making the gas flow paths.

The gas separators 15 and 16 and the resin frames 13 and 14 respectively have six holes 22 to 27 at corresponding positions along their outer peripheries. These holes 22 to 27 are arranged such that the corresponding holes overlap one another in the stacking direction to form fluid flow paths which pass through the inside of the fuel cell in the stacking direction in assembly of the fuel cell by stacking the gas separators 15 and 16 and the resin frames 13 and 14. More specifically, these holes 22 to 27 form reactive gas manifolds arranged to supply and discharge the respective reactive gases to and from the individual inner-cell gas flow paths, as well as coolant manifolds arranged to supply and discharge the cooling medium to and from the individual inter-cell coolant flow paths. Additionally, each of the gas separators 15 and 16 and the resin frames 13 and 14 has two engagement elements 28 in a concave/convex shape (concave and/or convex shape) provided along its outer periphery at such positions as to overlap one another in the stacking direction. The engagement elements 28 are structural elements used for stacking the unit cells 10 including the gas separators 15 and 16 and will be described in detail later.

As shown in FIG. 2, the fuel cell of this embodiment has stack structure formed by stacking a plurality of the unit cells 10 and is completed by sequentially placing a pair of current collectors 31, each having an output terminal 32 or 33, a pair of insulating plates 35 and end plates 36 and 37 on the respective ends of the stack of the unit cells 10. Each of the current collectors 31, the insulating plates 35 and the end plates 36 and 37 has a pair of engagement elements 28, like the gas separators 15 and 16 and the resin frames 13 and 14. Unlike the gas separators 15 and 16, however, the current collectors 31, the insulating plates 35 and the end plates 36 and 37 having no concave-convex shapes on their surfaces but having flat surfaces cause substantially no unevenness in contact pressure on the stacking surface even in the event of layer misalignment and may accordingly have lower accuracy of formation of the engagement elements 28 compared with the gas separators 15 and 16.

The current collector 31, the insulating plate 35 and the end plates 36 located on the front side in the illustration of FIG. 2 respectively have holes 41 to 46 formed at such positions as to overlap with the holes 22 to 27 formed in the gas separators in the stacking direction. The reactive gas or the cooling medium is supplied to or discharged from the corresponding manifold via corresponding one of these holes 41 to 46. The fuel cell stack 11 is actually kept in the state fastened under application of a predetermined pressing force in the stacking direction of the unit cells 10, although the fastening structure of the fuel cell stack 11 is omitted from the illustration of FIG. 2.

B. Assembling Process of Fuel Cell Stack 11

A procedure of manufacturing the fuel cell positions and bonds the gas separator 15 and the resin frame 13 to each other, while positioning and bonding the gas separator 16 and the resin frame 14 to each other. The procedure subsequently bonds the resin frames 13 and 14 to the power generation assembly 12 to product the unit cell 10. The procedure provides and sequentially stacks a plurality of the unit cells 10, so as to assemble the fuel cell stack 11.

Figure 3:
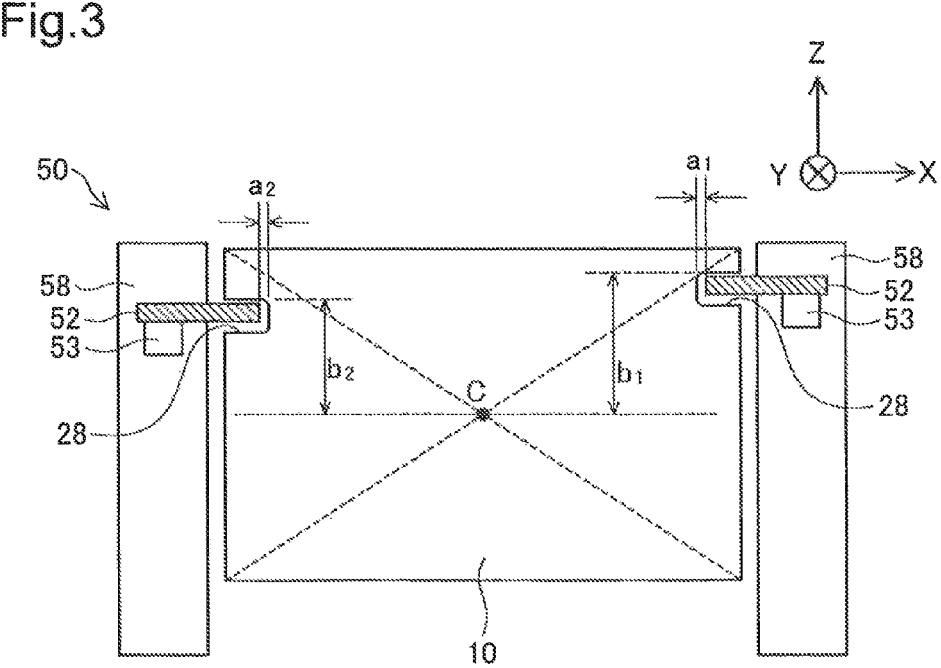
FIG. 3 is a diagram (front view) illustrating assembling the fuel cell stack.
Figure 4:
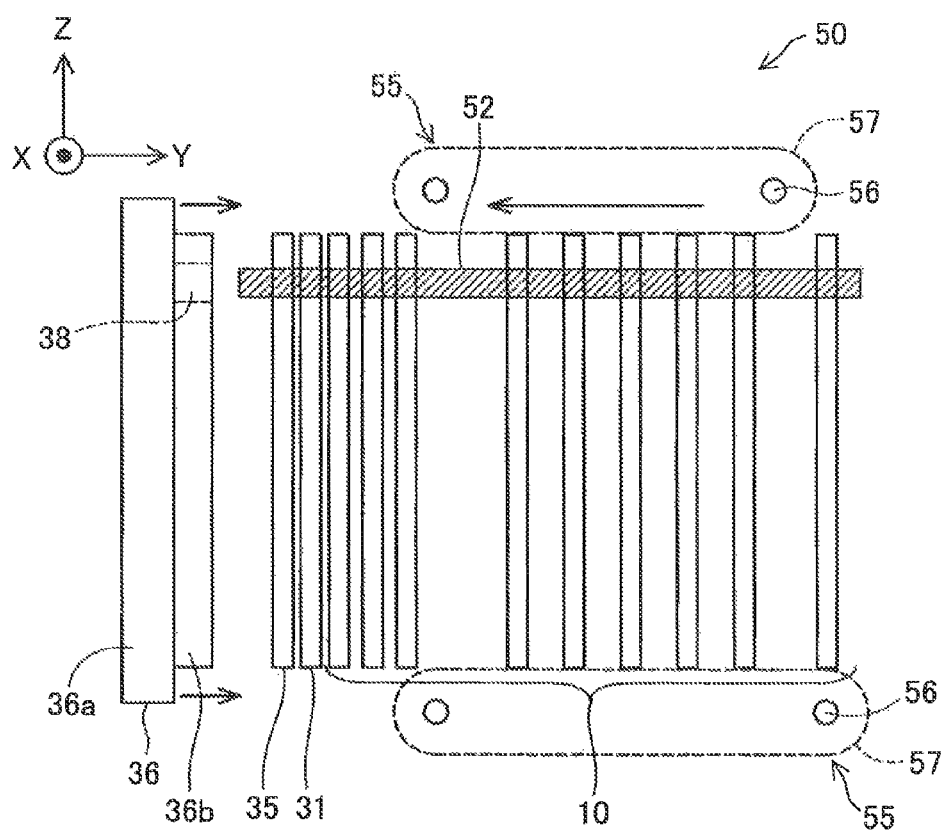
FIG. 4 is a diagram (side view) illustrating assembling the fuel cell stack.
Figure 5:
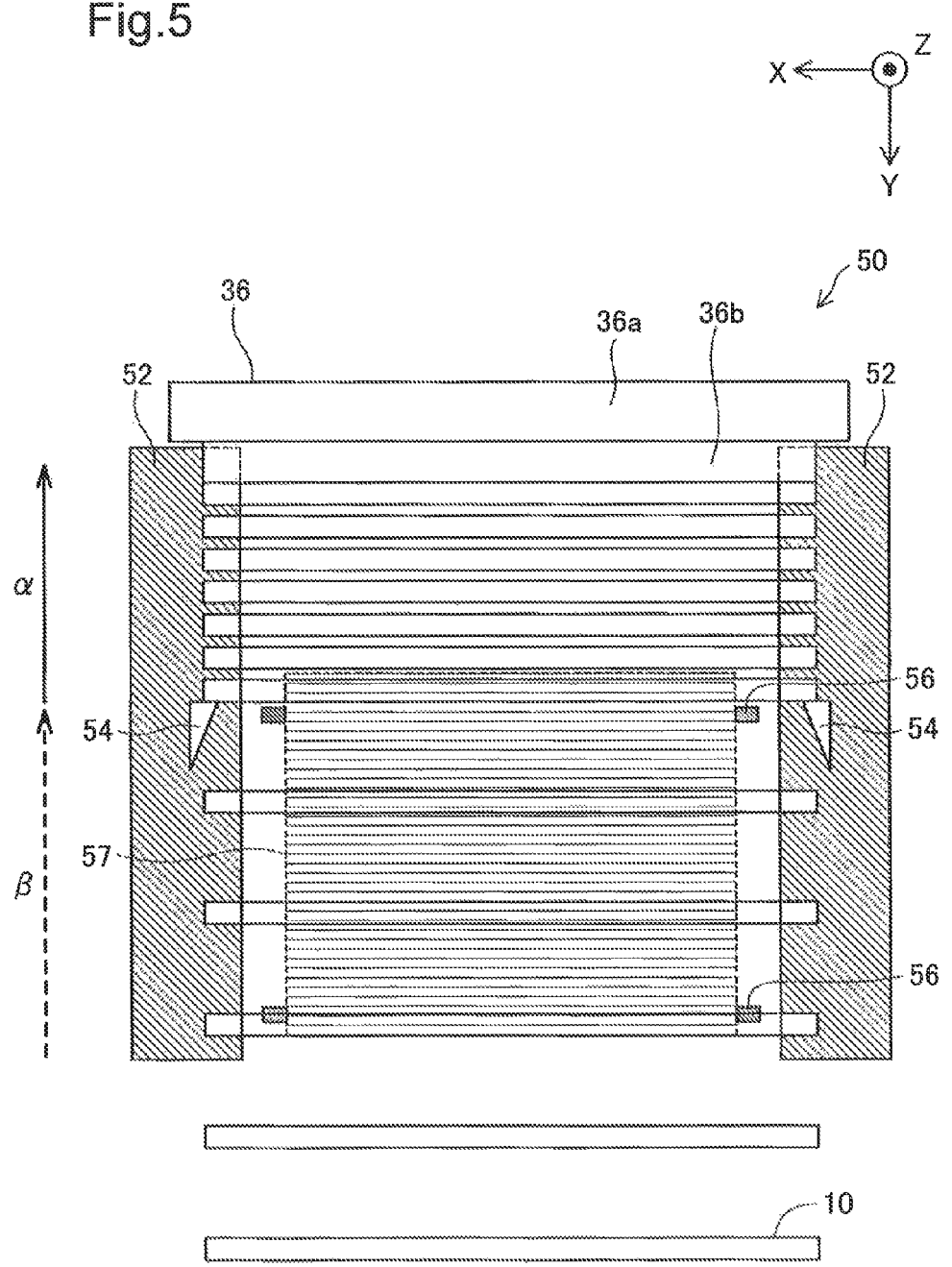
FIG. 5 is a diagram (top view) illustrating assembling the fuel cell stack.

FIGS. 3 to 5 are diagrams illustrating assembling the fuel cell stack 11. FIG. 3 is a front view; FIG. 4 is a side view; and FIG. 5 is a top view. According to this embodiment, in the course of assembly, the stacking surfaces of the respective unit cells 10 are arranged to be parallel to the direction of gravity and are stacked in the stacking direction. In FIGS. 3 to 5, the direction parallel to the longitudinal direction of the gas separators 15 and 16 (unit cell 10) is X direction, and the stacking direction perpendicular to the X direction is Y direction. Upward in the direction of gravity is Z direction. X direction is perpendicular to the Z direction. Y direction is perpendicular to the Z direction. The stacking surface herein denotes a specific surface of each unit cell 10 that is in contact with an adjacent unit cell 10 and a surface parallel to this specific surface in each member of the fuel cell stack 11.

As shown in FIGS. 3 to 5, a manufacturing apparatus 50 is used for assembling the fuel cell. The manufacturing apparatus 50 has a guide section 58. The guide section 58 has two guide members 52 of thin plates which are arranged parallel to each other, are extended in the stacking direction, i.e., in the Y direction and are located at different positions in projection in the direction of gravity (Z direction). In assembly of the fuel cell, the two engagement elements 28 provided on each unit cell 10 (provided on the gas separators 15 and 16 and the resin frames 13 and 14) are engaged with the two guide members 52. In other words, the two engagement elements 28 provided on each unit cell 10 are arranged corresponding to the positional relationship of the two guide members 52 in the front view of FIG. 3 (on the stacking surface of the unit cell 10).

In FIG. 3, a point C represents the center of gravity on the stacking surface of the unit cell 10 (center of gravity in the gas separators 15 and 16). The unit cell 10 (separators 15 and 16) of this embodiment is in the approximately rectangular shape, so that the center of gravity C is an intersection of diagonal lines. As shown in FIG. 3, the two engagement elements 28 provided on each unit cell 10 are respectively arranged at sides which are opposed to each other and are parallel to the direction of gravity in the process of stacking. In other words, the two engagement elements 28 provided on the unit cell 10 are arranged at positions away from each other in the horizontal direction across the center of gravity C. Additionally, the above two engagement elements 28 are both located above the center of gravity C in the direction of gravity. More specifically according to this embodiment, the two engagement elements 28 are configured to have different distances in the direction of gravity from the center of gravity C when the unit cells 10 are arranged in the orientation of stacking. In FIG. 3, a support location of one of the engagement elements 28 supported by corresponding one of the guide members 52 has a distance $b_1$ from the center of gravity C in the direction of gravity, while a support location of the other of the engagement elements 28 supported by corresponding other of the guide members 52 has a distance $b_2$ from the center of gravity C in the direction of gravity, where $b_2<b_1$. According to this embodiment, in the pair of engagement elements 28 provided on the unit cell 10, the engagement element 28 having the distance $b_1$ from the center of gravity C may be called first engagement element, and the engagement element 28 having the distance $b_2$ from the center of gravity C may be called second engagement element. In the pair of guide members 52, the guide member 52 to be engaged with the first engagement element may be called first guide member, and the guide member 52 to be engaged with the second engagement element may be called second guide member.

The engagement elements 28 in the concavo/convex shape are provided along the outer periphery of the unit cell 10 and are configured to be in a concave shape which is approximately rectangular and is open at each side of the unit cell 10 parallel to the direction of gravity. In the process of stacking the unit cells 10, each of the unit cells 10 is set in the manufacturing apparatus 50 such that the guide members 52 are fit in the two engagement elements 28 in the concave shape. This fitting causes the upper surfaces of the respective guide members 52 of thin plates to come into contact with the inner peripheries of the engagement elements 28 and support the unit cell 10 upward in the direction of gravity, so as to suspend the unit cell 10.

As shown in FIG. 3, when the unit cell 10 is set in the manufacturing apparatus 50, there are clearances having dimensions $a_1$ and $a_2$ in the X direction between the inner peripheries of the engagement elements 28 and the guide members 52. The sum of the dimensions $(a_1+a_2)$ of these clearances is set to be not greater than an allowable value as the tolerance of layer misalignment in the X direction in the fuel cell stack 11. The sum of the dimensions $(a_1+a_2)$ of the above clearances is set to ensure the smooth operation of engaging the engagement elements 28 with the two guide members 52. The margin for the smooth operation of engaging the engagement elements 28 with the two guide members 52 is also provided by the length of the engagement elements 28 in the direction of gravity (Z direction). The accuracy of layer alignment in the Z direction in the fuel cell stack 11 is determined by the accuracy of the positions of the upper surfaces of the two guide members 52 and the accuracy of the shape of the inner peripheries of the engagement elements 28 that are in contact with the upper surfaces of the guide members 52.

As shown in FIGS. 4 and 5, the end plate 36 has an end part 36a and a base part 36b protruded from the end part 36a in the stacking direction. The base part 36b has a stacking surface in substantially the same shape as that of each unit cell 10 and includes cuts 38 in a specific shape to just overlap with the engagement elements 28 in the stacking direction. The shape of the stacking surface of the end part 36a is an approximately rectangular shape that is extended in the circumferential direction to be slightly larger than the stacking surface of the base part 36b. In the process of assembling the fuel cell stack 11, one end of each of the two guide members 52 is fit in the cut 38 provided in the base part 36b of the end plate 36. For the better understanding of the respective operations, FIG. 4 illustrates the operation of sequentially stacking the plurality of unit cells 10, together with the first operation of fitting the guide members 52 in the cuts 38.

After one end of each of the two guide members 52 is fit in the cut 38, the insulating plate 35 and the current collector 31 are engaged with the guide members 52 in this sequence to be sequentially pressed against and stacked on the base part 36b of the end plate 36. The unit cells 10 are then sequentially engaged with the guide members 52 and are stacked. In the process of stacking the respective members including the unit cells 10, seal materials are appropriately placed between respective adjacent members. After stacking a desired number of unit cells 10, the current collector 35, the insulating plate 35 and the end plate 37 are engaged with the guide members 52 in this sequence to be stacked. The entire stacked body thus obtained is fastened under application of pressure in the stacking direction, so that the fuel cell stack 11 is completed. The foregoing describes the stacking operation of sequentially stacking from the end plate 36 having the holes 41 to 46 with reference to FIGS. 4 and 5. This sequence of stacking is, however, not restrictive but may be reversed. In the latter case, the procedure may place the end plate 37 first and sequentially stack the respective members from the end plate 37-side to the end plate 36-side to manufacture the fuel cell stack 11.

As shown in FIG. 3, the guide section 58 of the manufacturing apparatus 50 may be provided with vibration generators 53 to generate vibrations in the guide members 52 in order to suppress the respective guide members 52 from being closely in contact with the engagement elements 28 (i.e., in order to reduce the friction between the respective guide members 52 and the engagement elements 28). The vibration generator 53 may be, for example, an ultrasonic transducer. The ultrasonic transducer generates ultrasonic waves in the entire guide member 52 to keep the respective unit cells 10 in a slightly floating state and allows for linear conveyance of the respective unit cells 10. This results in suppressing a potential damage of the respective unit cells 10 caused by the above friction. The force for linear conveyance of the unit cells 10 is generated in the entire guide member 52 by the vibration generator 53. A force for moving the unit cells 10 in the direction of an arrow α accordingly acts even after the unit cells 10 are stacked, i.e., in the unit cells 10 in a range shown by the arrow α. The conveying power produced by the ultrasonic transducer is, however, generally not so large, so that no significant problem arises by the force of pressing the previously stacked unit cells 10 after each unit cell 10 moving toward the end plate 36 comes into contact with an adjacent unit cell 10 on the end plate 36-side.

The vibration generator 53 may be any element other than the ultrasonic transducer as long as it can generate vibration in the guide member 52 to suppress each of the guide members 52 from being closely in contact with the engagement element 28. The vibration generated by the vibration generator 53 needs to have a sufficiently small amplitude compared with the tolerance of layer misalignment in the process of stacking the unit cells 10.

In the process of stacking described above, after engagement of the guide elements 28 with the guide members 52, the operation of moving the unit cells 10 toward the end plate 36 (operation of moving in a range shown by an arrow β in FIG. 5) may be performed manually or may be performed mechanically using a conveyance device. As described above, in the configuration that the guide section 58 is provided with the ultrasonic transducers for linear conveyance of the unit cells 10, in order to improve the manufacturing efficiency, it is desirable to separately add the force of moving the unit cells 10. FIGS. 4 and 5 illustrate the configuration that the manufacturing apparatus 50 has conveyance devices 55. The conveyance devices 55 are provided both above and below the stacked body in the direction of gravity. Each of the conveyance devices 55 has a belt 57 which is driven and rotated in a fixed direction by two rotating shafts 56. These belts 57 come into contact with the upper side and the lower side of the respective unit cells 10, so as to move the respective unit cells 10 toward the end plate 36. Adjusting the drive speeds of the belts 57 in the upper and lower conveyance devices 55 to a constant speed enables the respective unit cells 10 to be translated while keeping the stacking surfaces of the respective unit cells 10 parallel to the direction of gravity. In the conveyance device 55, the belt 57 and the rotating shafts 56 are translated in the stacking direction (i.e., the Y direction and the direction away from the end plate 36) at a fixed speed corresponding to the drive speed of the belt 57, with progress of stacking the unit cells 10. Accordingly, irrespective of an increase in number of stacked unit cells 10, the positional relationship between a farthest end of the stacked body from the end plate 36 and the belt 57 is kept unchanged. The operation of moving and stacking the unit cells 10 using the conveyance devices 55 can thus be continued, irrespective of an increase in number of stacked unit cells 10.

As shown in FIG. 5, the conveyance device 55 is preferably provided with a temporary retainer 54 to suppress the occurrence of a reverse motion or a tilt of the unit cell 10 in the previously stacked unit cells 10 in the course of manufacture. A known anti-reverse mechanism used for preventing a reverse motion of a work to be conveyed by the conveyance device may approximately be employed for the temporary retainer 54. The temporary retainer 54 has a lever (claw) which allows a work to move in one direction (i.e., the unit cells 10 to move toward the end plate 36) but does not allow reverse move of the work. FIG. 5 illustrates only the lever as the temporary retainer 54.

The temporary retainer 54 shown in FIG. 5 is fixed in the conveyance device 55 at a specific position which is away from the rotating shafts 56 and the belt 57 and enables the farthest unit cell 10 away from the end plate 38 to be temporarily retained in the stacked unit cells 10 in the course of manufacture, while keeping the relative position to the rotating shafts 56 and the belt 57 unchanged. In other words, the temporary retainer 54 is fixed to the conveyance device 55 to be translated with the rotating shafts 56 and the belt 57 in the stacking direction (i.e., the Y direction and the direction away from the end plate 36) with the progress of the operation of stacking the unit cells 10. Such arrangement can keep temporarily retaining the farthest unit cell 10 from the end plate 36 in the stacked unit cells 10, irrespective of an increase in number of stacked unit cells 10 in the course of manufacture.

In a preferable configuration, a pair of the temporary retainers 54 are provided at positions of temporarily retaining the neighborhoods of both ends in the X direction of the unit cell 10 in at least the conveyance device 55 located on the upper side in the direction of gravity (Z direction side). This configuration can easily keep the state that the respective unit cells 10 are arranged parallel to the X direction in the stacked body in the course of manufacture. Forming the above lever (claw) of the temporary retainer 54 to be longer downward in the direction of gravity facilitates the respective unit cells 10 to be kept parallel to the direction of gravity (Z direction) in the stacked body in the course of manufacture. Similarly providing a pair of the temporary retainers 54 in the conveyance device 55 located on the lower side in the direction of gravity further facilitates the respective unit cells 10 to be kept parallel to the direction of gravity.

In the configuration of this embodiment described above, the unit cells 10 are stacked in the suspended state, while being engaged with the guide members extended in the stacking direction which is perpendicular to the direction of gravity. This configuration keeps the unit cells 10 parallel to the direction of gravity by taking advantage of the gravitational force and facilitates positioning and stacking of the unit cells 10 with high accuracy. In other words, this configuration suppresses the tilt of the individual unit cells 10 in the course of stacking the unit cells 10 from being accumulated in the entire stacked body. Even when a tilting force acts on the unit cell 10 to be stacked, the gravitational force acts in the direction of compensating for the tilt, so that the unit cells 10 can be readily kept parallel to each other. Stacking the unit cells 10 in the suspended state does not cause the gravitational force to act in the stacking direction in the stacked unit cells 10 and accordingly does not increase the contact pressure in the respective unit cells 10 due to the gravitational force. This configuration thus relatively facilitates the operation of compensating for the layer misalignment of the previously stacked unit cells 10. The state of the "guide member 52 extended in the stacking direction" includes not only the state that the guide member 52 is extended in the direction completely perpendicular to the direction of gravity but the state that the guide member 52 is extended at an angle of not greater than 5 degrees with respect to the direction perpendicular to the direction of gravity.

Additionally, in the configuration of this embodiment, the engagement elements for suspending the unit cell 10 are arranged above the center of gravity C of the unit cell 10 in the direction of gravity to be away from each other across the center of gravity C in the horizontal direction when the unit cells 10 are arranged in the orientation of stacking. Accordingly no upward force in the direction of gravity is applied to the unit cell 10 when the unit cell 10 is suspended. This configuration suppresses the suspended unit cell 10 from being swung about the engagement element and thereby suppresses the unit cells 10 from being shifted in the direction of rotation in the course of stacking. In the above description with reference to FIG. 3, for the simplicity of explanation, it is assumed that the center of gravity C is placed at the intersection of diagonal lines of the unit cell 10 having the stacking surface in an approximately rectangular shape. The center of gravity C may be determined according to the outer circumferential shape of the stacking surface of the unit cell 10 (gas separators 15 and 16). More specifically, the center of gravity C may be determined according to the outer circumferential shape of the unit cell 10 including the concave-convex shape (e.g., first and second engagement elements 28) provided on the outer periphery of the unit cell 10 and holes (e.g., holes 22 to 27 arranged to form fluid flow paths in the fuel cell) on the stacking surface of the unit cell 10.

Figure 6:
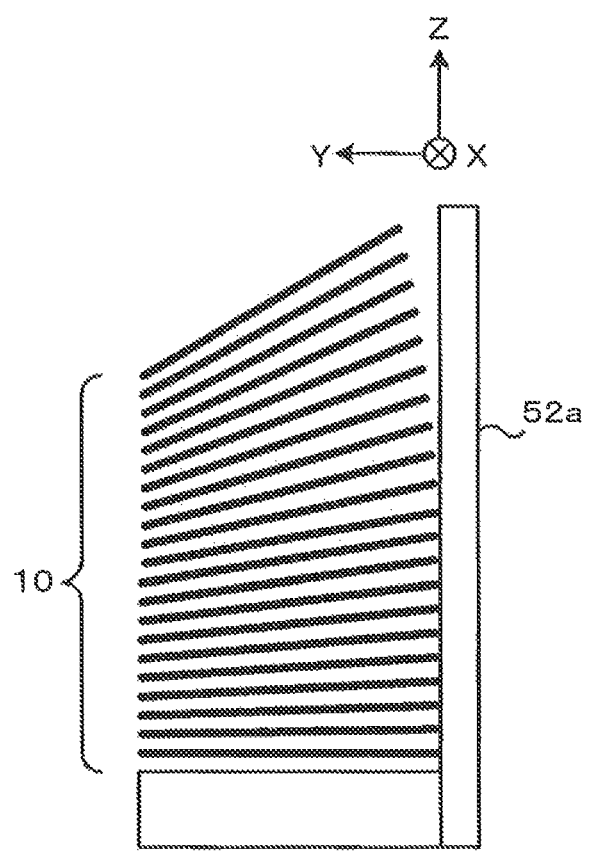
FIG. 6 is a diagram illustrating stacking unit cells in the direction of gravity.

FIG. 6 is a diagram illustrating stacking the unit cells 10 in the direction of gravity while positioning the outer peripheries of the unit cells 10 along (to abut against) a guide member 52a which is extended parallel to the direction of gravity unlike the above embodiment. In this configuration, the frictional force acts upward in the direction of gravity (Z direction) on each of the unit cells 10. Accordingly, in the stacked body in the course of manufacture, an opposite side of each unit cell 10 which is opposite to the side of the unit cell 10 abutting against the guide member 52a is compressed more, so that the stacked body is likely to be tilted toward the side away from the guide member 52a. A reactive force in the horizontal direction (Y direction) is further applied by the guide member 52a, so that the stacked body is more likely to be tilted in the above manner. In the configuration that the unit cells 10 are stacked in the direction of gravity as shown in FIG. 6, the seal materials placed between the respective unit cells 10 are crushed by the gravitational force to enhance the adhesion strength between the respective unit cells 10. This makes it difficult to move the unit cells 10 after stacking and thereby interferes with the operation of compensating for a tilt in the stacked body after stacking.

Figure 7A:
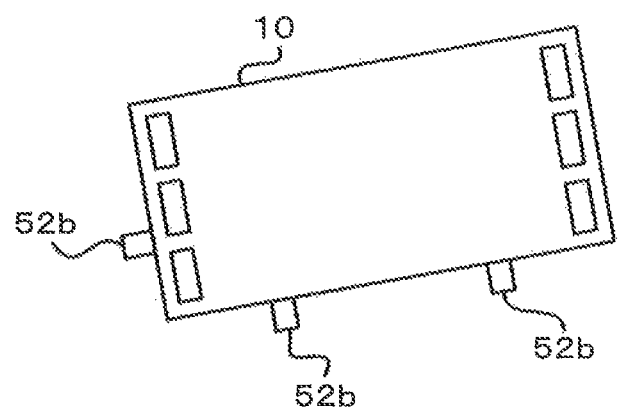
FIGS. 7A and 7B are diagrams illustrating stacking unit cells in an inclined orientation.
Figure 7B:
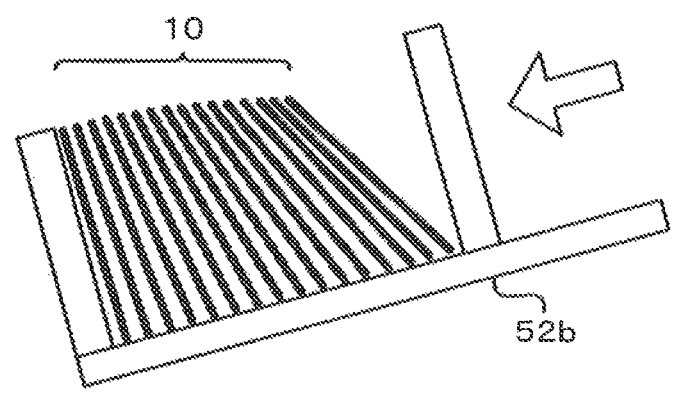

FIGS. 7A and 7B are diagrams illustrating a configuration that stacking surfaces of respective unit cells 10 are inclined to bring the respective unit cells 10 into contact with a guide member by action of the gravitational force and that a stacked body is further inclined in the stacking direction to prevent the respective stacked unit cells 10 from falling. FIG. 7A is a front view of the stacked body, and FIG. 7B is a side view of the stacked body, in this configuration, the unit cells 10 are stacked while the outer peripheries of the unit cells 10 are positioned along a guide member 52b. The guide member 52b is arranged such as to incline the stacked body in the above manner. The configuration of stacking with inclination of the stacked body may reduce a potential fall of each unit cell 10, compared with the configuration of stacking in the direction of gravity as shown in FIG. 6. Little falls of the respective unit cells 10 may, however, be accumulated to tilt the entire stacked body. Additionally a partial component of the gravitational force acts in the stacking direction, so as to compress the seal materials between the respective unit cells 10 and enhance the adhesion strength. This also interferes with the operation of compensating for a tilt of the unit cell 10 in the stacked body after stacking.

In the configuration of this embodiment that the respective unit cells 10 are stacked while being suspended parallel to the direction of gravity, on the other hand, the stacking surfaces of the respective unit cells 10 are arranged parallel to the direction of gravity, so that the respective unit cells 10 are readily kept parallel to one another. This does not cause the excessive adhesion strength between the adjacent unit cells 10 by action of the gravitational force and accordingly suppresses the problems arising in the configurations of FIGS. 6 and 7 described above.

Figure 8:
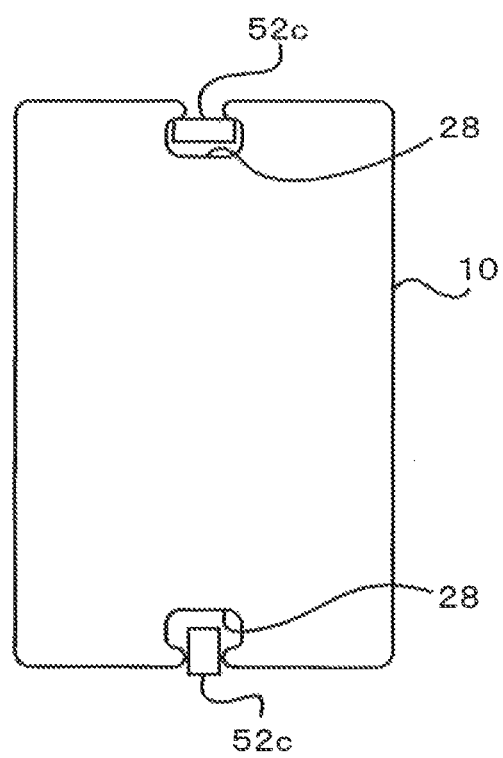
FIG. 8 is a diagram illustrating the structure with engagement elements provided at centers of an upper side and a lower side of a unit cell.

FIG. 8 is a diagram illustrating a configuration in a front view that engagement elements 28 are provided at the centers of an upper side and a lower side of each unit cell 10 and that a manufacturing apparatus for a fuel cell is provided with guide members 52c which are arranged to be parallel to each other and away from each other in the direction of gravity by a distance between the above two engagement elements and are extended in the stacking direction which is perpendicular to the direction of gravity. Since the gravitational force does not act in the stacking direction, this configuration also suppresses a tilt of the gas separator in the course of stacking like this embodiment. In the configuration of suspending the gas separator at the center of the upper side of the gas separator, however, the unit cell 10 is likely to swing about the guide member 52c on the upper side, due to a clearance between the engagement element 28 on the lower side and the guide member 52c, which is inevitably required for the fitting operation. More specifically, an upward force in the direction of gravity is applied to the unit cell 10 by the guide member 52c on the lower side, so that the unit cell 10 is likely to be moved in the direction of rotation by a relatively small force. Shifting the respective unit cells 10 in the direction of rotation reduces the accuracy of stacking.

According to this embodiment, each unit cell 10 is suspended by the engagement elements 28 which are arranged away from each other in the horizontal direction across the center of gravity C of the unit cell 10. This arrangement suppresses shift in the direction of rotation as well as shift in the horizontal direction. A force having an upward component in the direction of gravity is needed to rotate the unit cell 10. In the configuration of suspending the unit cell 10 at the two opposed positions like this embodiment, a large rotational moment is needed for rotational motion of the unit cell 10. The unit cell 10 of the embodiment is, however, suspended by the gravitational force without being supported on its lower side in the gravitational force. This configuration is thus unlikely to cause such a large rotational moment and thereby suppresses a potential rotational shift.

Figure 9:
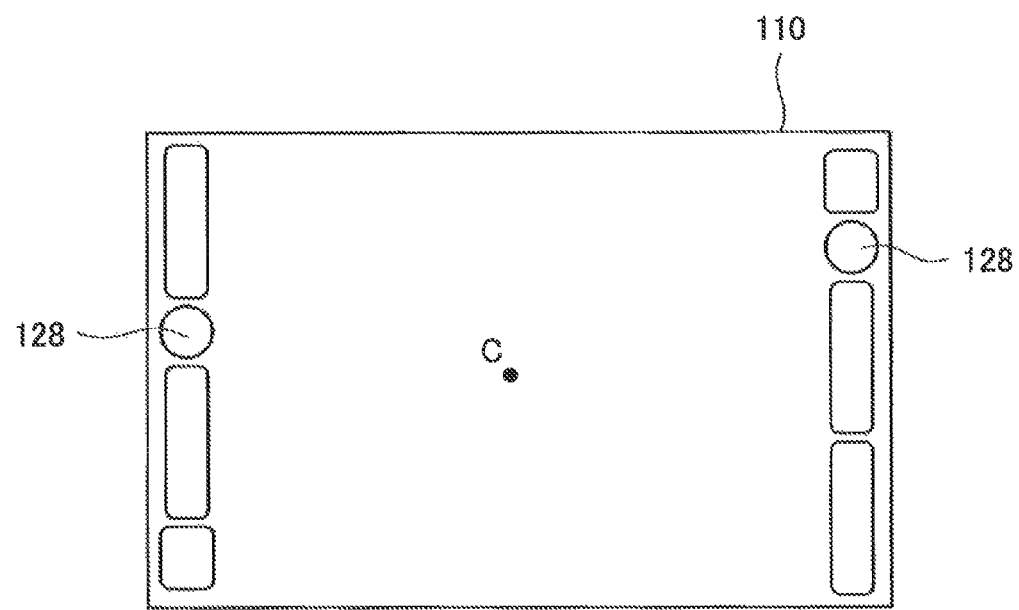
FIG. 9 is a diagram illustrating the structure of a unit cell with pin holes provided instead of the engagement elements.
Figure 10A:
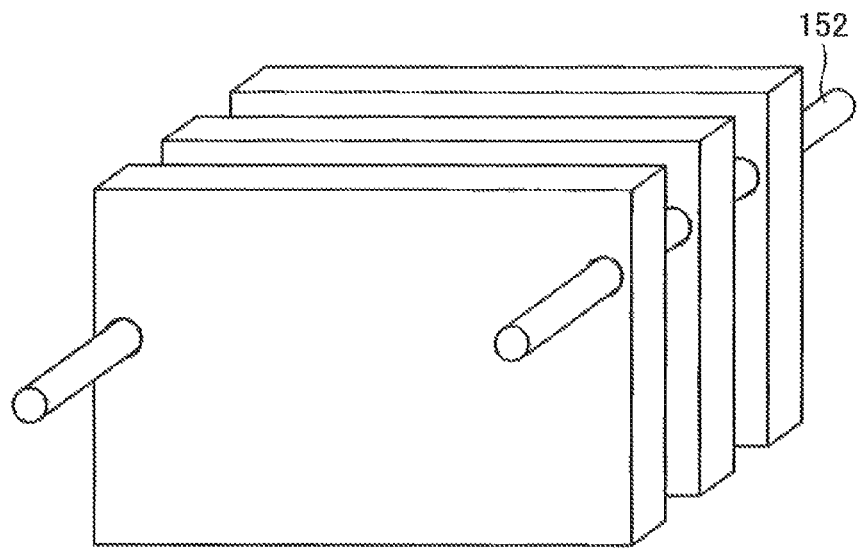
FIGS. 10A and 10B are diagrams illustrating stacking unit cells.
Figure 10B:
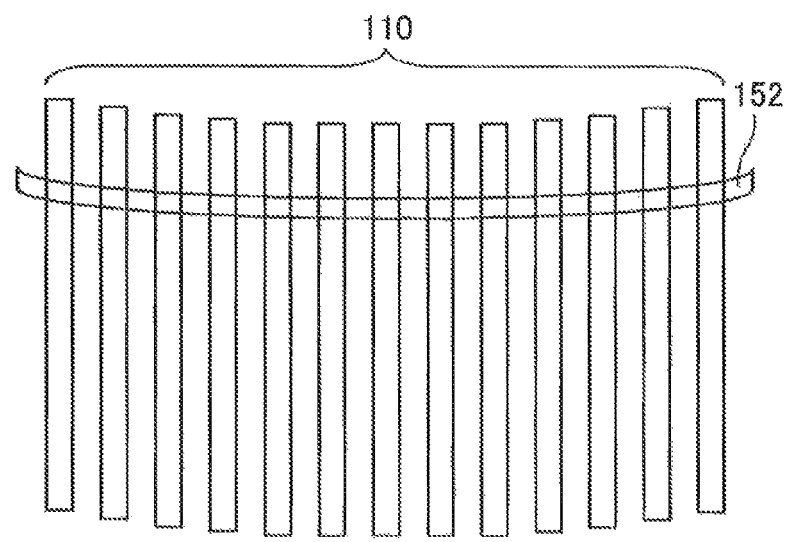

FIG. 9 is a diagram illustrating the schematic configuration of a unit cell 110 having pin holes 128 provided in place of the engagement elements 28 of the embodiment. FIGS. 10A and 10B are diagrams illustrating stacking the unit cells 110. FIG. 10A is a perspective view, and FIG. 10B is a schematic side view.

As shown in FIG. 9, the pin holes 128 are holes formed in the neighborhood of the outer periphery of the unit cell 110 and away from the outer periphery. Guide pins 152 provided in a manufacturing apparatus are inserted through these pin holes 128 for stacking. This configuration needs that the unit cells 110 are sequentially set from one end of each of the guide pins 152. Additionally, when a certain unit cell 110 is to be removed from the guide pins 152 after stacking, all the unit cells 110 stacked after the certain unit cell 110 should be removed before the certain unit cell 110 is removed from the one end of each of the guide pins 152. The guide pin 152 is not supported in the middle in the stacking direction. The guide pin 152 may thus be gradually bent by the weight of the stacked unit cells 110 as shown in FIG. 10B, and such bend of the guide pins 152 may cause layer misalignment of the unit cells 110. In order to suppress the bend of the guide pins 152, the guide pins 152 should be thickened to have the higher rigidity. This leads to the necessity of expanding the pin holes 128 and thereby unnecessarily increases the area of the unit cell 110. Additionally, in the configuration of suspending the unit cell 110 using the pin holes 128, the accuracy of formation of the entire pin holes 128 should be enhanced to suppress layer misalignment. This may undesirably complicate the manufacturing process.

In the configuration of this embodiment, on the other hand, the engagement elements 28 are provided along the outer periphery of the unit cell 10 and are configured to be in the concave shape which is open at each side of the unit cell 10 parallel to the direction of gravity. This configuration enables the unit cell 10 to be readily attached and detached at any desired position to and from the guide member 52 of the manufacturing apparatus 50. The engagement element 28 of the unit cell 10 is engaged with the guide member 52 at a position in the middle of the guide member 52 in the rail-like shape. The structure for supporting the guide member 52 can thus be provided in the manufacturing apparatus 50 along the entire length in the stacking direction in which the guide member 52 is extended, without interfering with the operation for engagement of the unit cell 10. Compared with the configuration of suspending the respective unit cells by insertion of the pin-like guide members through the holes as shown in FIGS. 9 and 10, this configuration enhances the strength of the guide members. As a result, even when a large number of stacked unit cells 10 are supported by the guide members 52, this configuration reduces the bend of the guide members 52 and thereby suppresses layer misalignment without increasing the cross sectional area of the guide members 52. The configuration of this embodiment has no need for the high accuracy of the entire concave shape but only the need for the accuracy of the sum $(a_1+a_2)$ shown in FIG. 3 and the accuracy of the inner peripheral shape of the engagement element 28 that is in contact with the upper surface of the guide member 52. This accordingly suppresses complication of the manufacturing process for the high accuracy of formation of the engagement elements 28.

According to this embodiment, the pair of engagement elements 28 are configured to have different distances in the direction of gravity from the center of gravity C when the unit cells 10 are arranged in the orientation of stacking. This enhances the visual recognition with regard to the orientation (front and back sides) of the unit cells 10 and thereby improves the workability during assembly for stacking the unit cells 10. Alternatively the pair of engagement elements 28 may be configured to have the same distances in the direction of gravity from the center of gravity C when the unit cells 10 are arranged in the orientation of stacking.

FIG. 11 is an enlarged view illustrating the neighborhood of the engagement element 28 according to the embodiment. In the respective members with the engagement elements 28 such as the gas separators 15 and 16, it is preferable to chamfer and round the corners of the outer periphery of the concavo/concave shape of the engagement element 28, in order to enhance the safety in handling. In FIG. 11, R represents the rounded corners.

The length of an effective flat portion of the engagement element 28 that is allowed to come into contact with the guide member 52 may be, for example, 3 to 4 mm. The effective flat portion denotes a horizontal portion along the inner periphery of the engagement element 28 that is allowed to come into contact with the upper surface of the guide member 52 and has a length except the rounded part when the corners of the engagement element 28 are rounded. In FIG. 11, a length L denotes the length of the effective flat portion. The length of the effective flat portion may be any value that ensures the sufficient supporting force for suspending the unit cell 10.

In FIG. 11, a depth D denotes a depth of the engagement element 28 in the horizontal direction. It is preferable that the pair of engagement elements 28 provided on each unit cell 10 have different depths D. In the configuration that the engagement elements 28 have different depths D, in the process of engaging the unit cell 10 with the guide members 52, the engagement element 28 of the greater depth D is first subject to the operation of engagement with the guide member 52. This further facilitates the operation of attaching the unit cell 10 to the manufacturing apparatus 50.

According to this embodiment, the engagement elements 28 are used for engagement of the unit cells 10 with the guide members 52 of the manufacturing apparatus 50 in the course of stacking the unit cells 10. The engagement elements 28 may be used additionally for different purposes, such as interline conveyance. For example, the engagement elements 28 may be used to convey the unit cells 10 to the manufacturing apparatus 50 after manufacture of the respective unit cells 10. More specifically, conveyor rails extended in the stacking direction like the guide members 52 are provided from the place where the unit cells 10 are manufactured to the neighborhood of the manufacturing apparatus 50. The engagement elements 28 may be engaged with these conveyor rails, and the unit cells 10 may be conveyed to the manufacturing apparatus 50. In this application, the interval between the adjacent unit cells 10 to be conveyed should be increased at each number of unit cells 10 required to form each fuel cell stack 11. This facilitates the operation of assembling the fuel cell stack 11. In the application of conveying the unit cells 10 in the above manner, any unit cell 10 having a failure can be readily pulled out and replaced. Similarly the engagement elements 28 of the gas separators 15 and 16 may be engaged with conveyor rails, and the gas separators 15 and 16 may be conveyed from the place where the gas separators 15 and 16 are manufactured to the place where the unit cells 10 are assembled.

C. Modifications

Modification 1 (Modification with Regard to Shapes of Engagement Elements and Guide Members)

FIGS. 12 to 15 are diagrams illustrating modifications having different shapes of engagement elements. The engagement elements 28 are configured to be in the concave shape which is approximately rectangular and is open at each side of the unit cell 10 parallel to the direction of gravity in the above embodiment, but may have different configurations.

Figure 12:
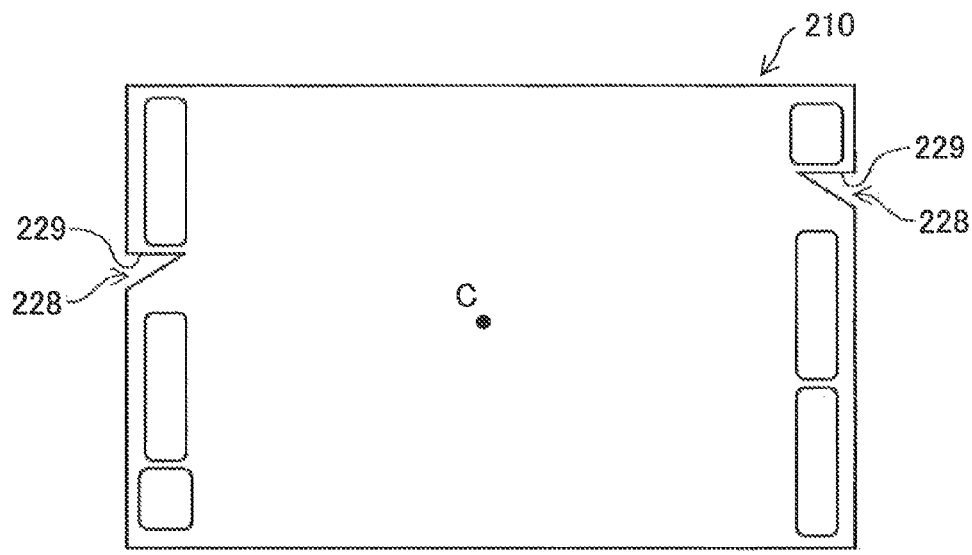
FIG. 12 is a diagram illustrating a modification having a different shape of engagement elements.

FIG. 12 is a plan view illustrating the shape of a unit cell 210 (gas separator) having engagement elements 228 configured to be in a concave shape which is approximately triangular and is open at each side of the unit cell 10 parallel to the direction of gravity. The unit cell 210 of this configuration is engaged with the guide members 52 at its inner peripheral portions 229 of the engagement elements 228 extended in the horizontal direction.

Figure 13:
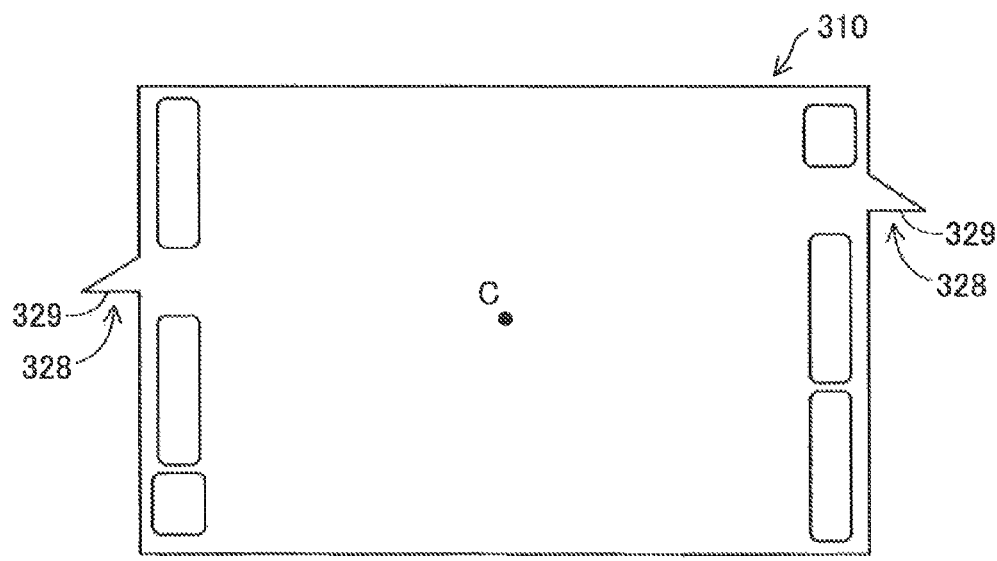
FIG. 13 is a diagram illustrating another modification having a different shape of engagement elements.

FIG. 13 is a plan view illustrating the shape of a unit cell 310 (gas separator) having engagement elements 328 configured to be in a convex shape which is approximately triangular and is protruded from each side of the unit cell 10 parallel to the direction of gravity. The unit cell 310 of this configuration is engaged with the guide members 52 at its outer peripheral portions 329 of the engagement elements 328 extended in the horizontal direction.

Figure 14:
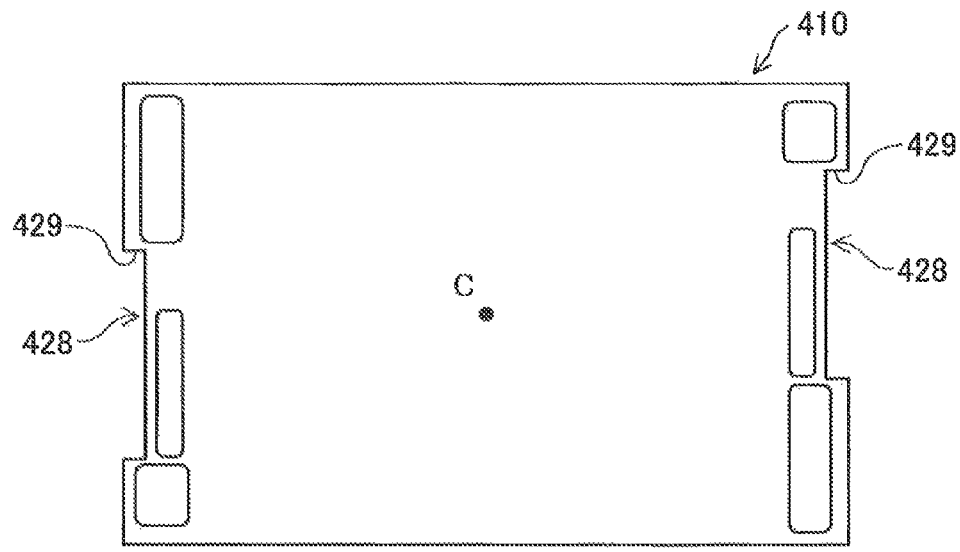
FIG. 14 a diagram illustrating another modification having a different shape of engagement elements.

FIG. 14 is a plan view illustrating the shape of a unit cell 420 (gas separator) having engagement elements 428 configured to be in an approximately rectangular concave shape at the sides of the unit cell 10 parallel to the direction of gravity. The unit cell 420 of this configuration is engaged with the guide members 52 at its inner peripheral portions 429 of the engagement elements 428 extended in the horizontal direction. In the configuration having concave-convex shapes formed along the outer periphery of the unit cell 10 because of any other reason, such concave-convex shapes may be used as the engagement elements without separately providing engagement elements in a specified concave/convex shape along the outer periphery of the unit cell 10.

Figure 15:
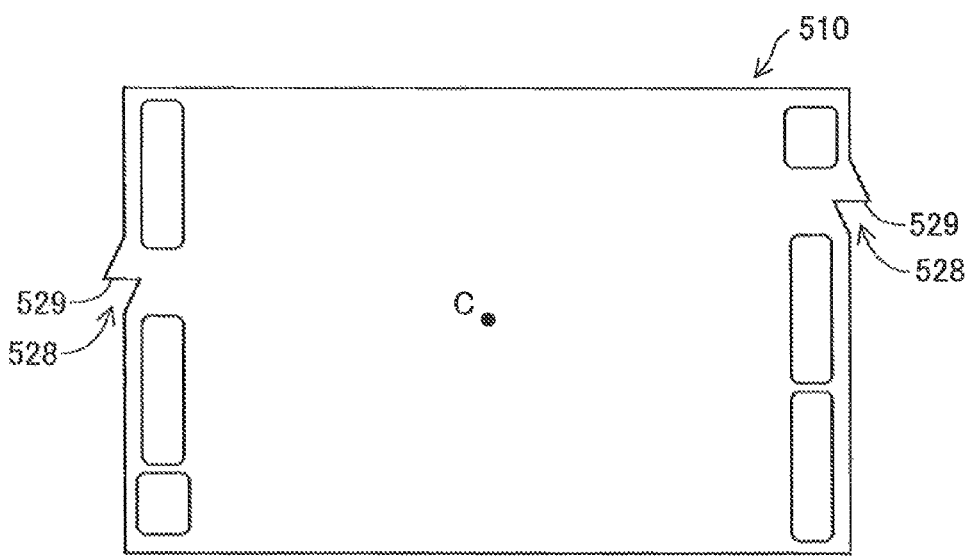
FIG. 15 a diagram illustrating another modification having a different shape of engagement elements.

FIG. 15 is a plan view illustrating the shape of a unit cell 520 (gas separator) having engagement elements 528 configured in a combination of a concave shape which is approximately triangular and is open at each side of the unit cell 10 parallel to the direction of gravity and a convex shape which is approximately triangular and is protruded from each side of the unit cell 10 parallel to the direction of gravity. The unit cell 510 of this configuration is engaged with the guide members 52 at its outer peripheral portions 529 of the engagement elements 228 extended in the horizontal direction. Any of the concave shape, the convex shape and the combination in each of the engagement elements shown in FIGS. 12 to 15 corresponds to the "concave and/or convex shape" described in Solution to Problem in the application hereof.

Figure 16:
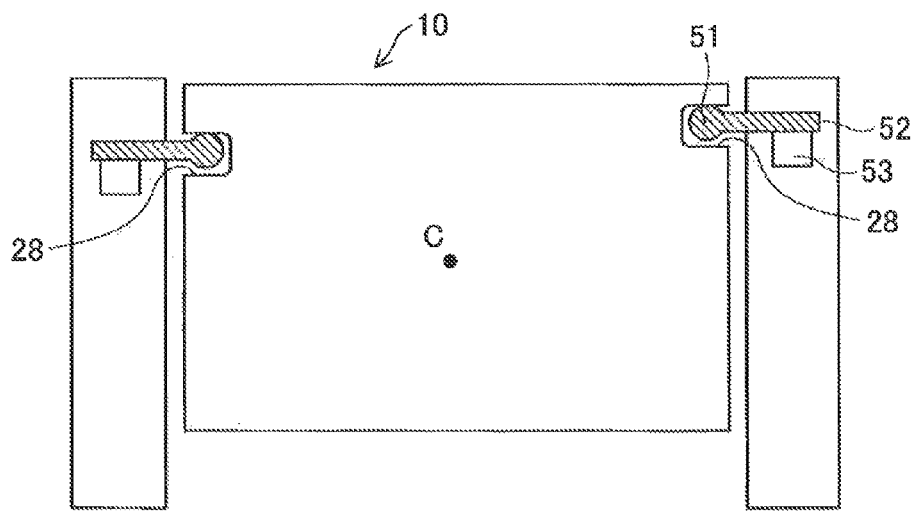
FIG. 16 is a diagram illustrating a modification having a different shape of guide members.

FIG. 16 is a diagram illustrating a modification having a different shape of guide members. The configuration shown in FIG. 16 is similar to the configuration of the above embodiment, except that each of the guide members 52 has a curved portion 51 at its end to have an approximately circular cross section in the stacking direction. Decreasing the contact area between the guide member 52 and the engagement element 28 in this manner reduces the frictional force generated between the guide members 52 and the unit cell 10 (gas separators 15 and 16) and suppresses damage of the unit cell 10 caused by this frictional force.

Figure 17:
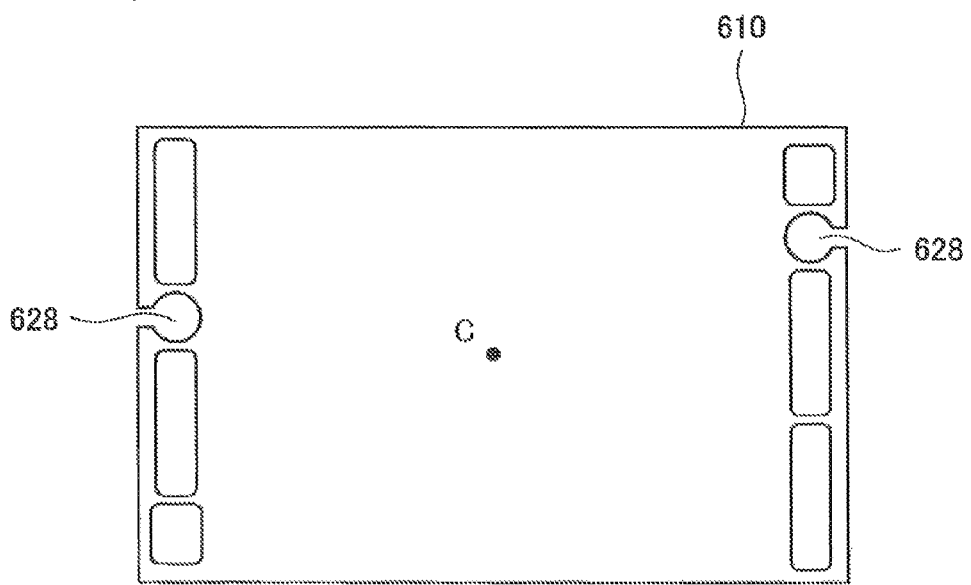
FIG. 17 a diagram illustrating another modification having a different shape of engagement elements.
Figure 18:
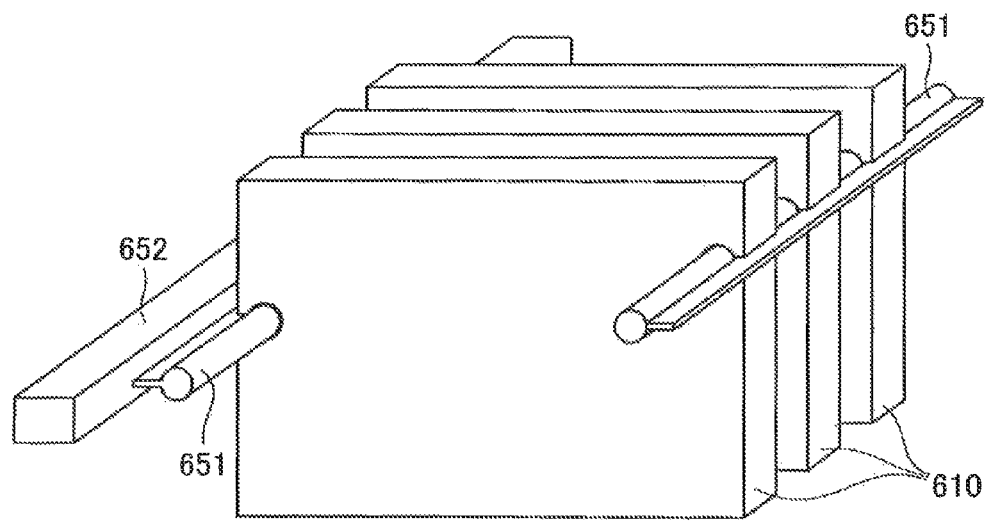
FIG. 18 is a perspective view illustrating stacking unit cells through engagement with guide members.

FIG. 17 is a plan view illustrating the shape of a unit cell 610 (gas separator) having engagement elements 628 in a further different shape. FIG. 18 is a perspective view illustrating stacking the unit cells 610 through engagement with guide members 652. As shown in FIG. 17, the engagement elements 628 are provided in the neighborhood of the outer periphery of the unit cell 610 and are configured as holes in an approximately circular shape to be open at and continuous with respective portions of the outer periphery of the unit cell 610 closest to these holes. More specifically, the engagement element 628 is configured as a hole in the approximately circular shape to be open at and directly continuous with a side of the unit cell 610 closest to the hole and parallel to the direction of gravity. Each of the guide members 652 used for stacking the unit cells 610 of this configuration has a curved portion 651 formed in an approximately cylindrical shape and extended in the stacking direction to have a cross sectional shape corresponding to the hole in the approximately circular shape. The curved portion 651 is supported along the entire length in the stacking direction. FIG. 18 illustrates only part of the structure for supporting the curved portion 651. This structure effectively suppresses the bent of the guide members 652 along the entire length in the stacking direction in which the guide members 652 are extended, without excessively increasing the diameter of the cross section of the guide members 652 for supporting the guide members 652. This configuration accordingly has similar advantageous effects to those of the above embodiment, except that the unit cells 610 should be set from one end of each of the guide members 652.

Figure 19:
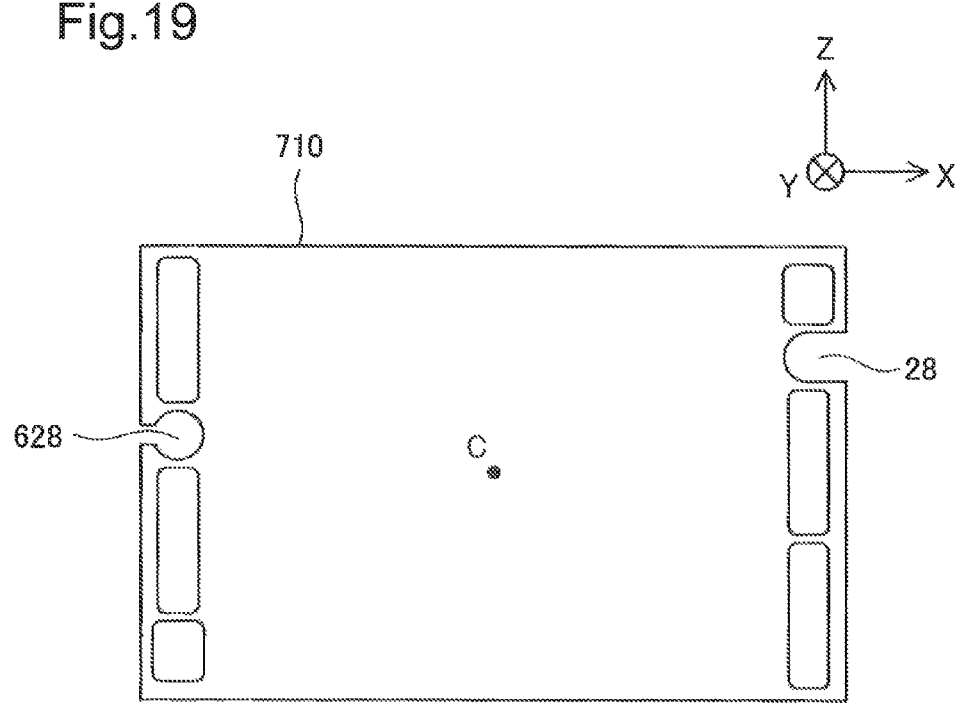
FIG. 19 is a diagram illustrating another modification having different shapes of engagement elements.

FIG. 19 is a plan view illustrating the shape of a unit cell 710 (gas separator) having further different shapes of engagement elements. With regard to a pair of engagement elements provided in the unit cell 710, one engagement element is formed in a shape substantially similar to the shape of the engagement element 28 of the embodiment described above, while the other engagement element is formed in a shape substantially similar to the shape of the engagement element 628 shown in FIG. 17. This configuration has similar advantageous effects to those of the unit cell 610. The unit cell 710 is positioned in the X-Z directions by the engagement element 626 having the approximately circular cross section that is partly open at the outer periphery of the unit cell 710. The engagement element 28, on the other hand, serves to position the unit cell 710 in the direction of rotation. Compared with the configuration having the engagement elements both formed in the shape of the engagement element 628 as shown in FIG. 17, the configuration having one of the engagement elements formed in the shape of the engagement element 28 as shown in FIG. 19 allows the engagement elements and the guide members to be formed with the lower accuracies and facilitates the operation of stacking, while ensuring the positioning accuracy.

In the embodiment, the unit cell 10 (gas separators 15 and 16) is configured to have the two engagement elements 28, and the manufacturing apparatus 50 is configured to have the two guide members 52. Three or more sets of engagement elements and guide members may, however, be provided. In the configuration having three or more sets of engagement elements and guide members, it needs that the unit cell 10 is substantially suspended by specified two sets of engagement elements and guide members arranged above the center of gravity of the gas separator in the direction of gravity to be away from each other in the horizontal direction across the center of gravity. In this configuration, the engagement elements and the guide members other than the two sets substantially contributing to suspend the unit cells 10 described above secondarily contribute to suppress the individual unit cells 10 from being tilted in the direction of gravity in the course of stacking the unit cells 10 and prevent layer misalignment. In one preferable configuration, the engagement elements and the guide members making a secondary contribution are provided below the center of gravity of the gas separator in the direction of gravity.

Modification 2 (Modification with Regard to Arrangement of Engagement Elements and Guide Members)

Figure 20:
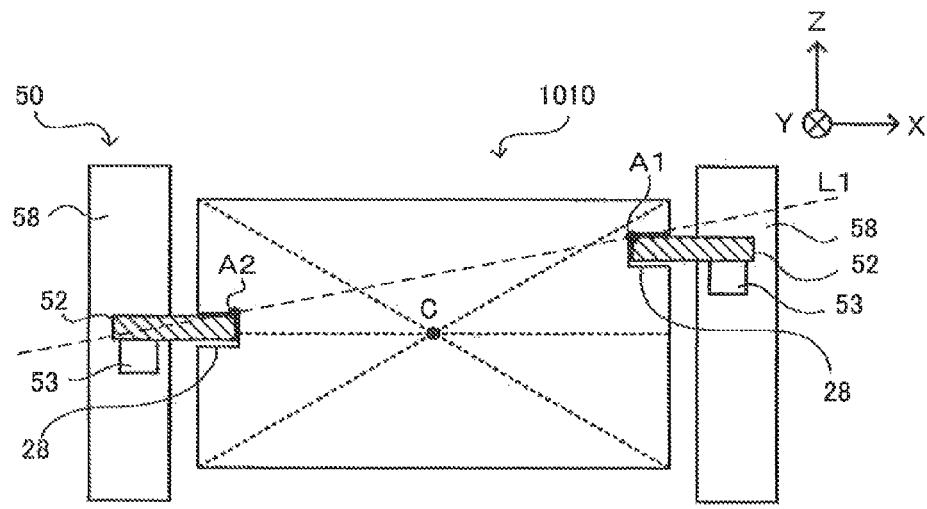
FIG. 20 is a diagram illustrating a modification with regard to the arrangement of engagement elements and guide members.

FIG. 20 is a diagram illustrating a modification with regard to the arrangement of engagement elements and guide members. In the embodiment and Modification 1 described above, the pair of engagement elements (first engagement element and second engagement element) provided on the unit cell are entirely placed above the center of gravity C in the stacking surface of the unit cell (center of gravity of the gas separator) in the direction of gravity when the unit cell is suspended in the manufacturing apparatus 50. This arrangement is, however, not restrictive but a different arrangement may be employed. FIG. 20 is a front view illustrating a unit cell 1010 engaged by guide members 52 of a manufacturing apparatus 50, which is similar to the manufacturing apparatus 50 shown in FIG. 3. The like components of FIG. 20 to those of FIG. 3 are expressed by the like reference numbers and are not specifically described herein.

In the modification of FIG. 20, a first support location A1 and a second support location A2 denote locations nearest to the center of gravity C respective supported areas of first and second engagement elements 28 provided on the unit cell 1010 which are to be supported upward in the direction of gravity by the corresponding guide members 52. As described previously, in the pair of engagement elements 28, the engagement element 28 having the first support location A1 at the upper position in the direction of gravity is called the first engagement element 28, and the engagement element 28 having the second support location A2 at the lower position in the direction of gravity is called the second engagement element 28. The guide member 52 to be engaged with the first engagement element 28 is called the first guide member 2, and the guide member 52 to be engaged with the second engagement element 28 is called the second guide member 52.

In the unit cell 1010 of FIG. 20, in the pair of engagement elements 28, the second engagement element 28 is formed to be partly extended to below the center of gravity C in the direction of gravity. In the unit cell 1010, however, the center of gravity C is located in a lower area in the direction of gravity below a straight line L1 of connecting the first support location A1 with the second support location A2. The first support location A1 and the second support location A2 are arranged to be away from each other across the center of gravity C in the horizontal direction. Like the configuration of the above embodiment, the configuration of the modification facilitates the operation of positioning and stacking unit cells with high accuracy, while suppressing the layer misalignment during stacking.

As described above, even when at least one of the engagement elements 28 is formed to be placed at least partly below the center of gravity in the direction of gravity, the arrangement of locating the center of gravity C in the direction of gravity below the straight line L1 of connecting the first support location A1 with the second support location A2 ensures the similar advantageous effects to those of the embodiment described above. The second support location A2 at the lower position in the direction of gravity in the first and the second support locations A1 and A2 may be placed below the center of gravity C in the direction of gravity. The arrangement of placing both the first support location A1 and the second support location A2 above the center of gravity in the direction of gravity is, however, preferable in terms of suspending the unit cell more stably.

The first and the second engagement elements 28 are formed in the unit cell such that the first support location A1 and the second support location A2 satisfy the above positional relation. When the unit cell is set in the direction of stacking, the first support location and the second support location have different distances from the center of gravity C in the direction of gravity. This facilitates discrimination between the surface and the rear face of the unit cell. As a result, this improves the workability in assembly of stacking the unit cells 10.

The first support location A1 and the second support location A2 may, however, have identical distances from the center of gravity C in the direction of gravity when the unit cell is set in the direction of stacking. The arrangement of locating the center of gravity C in a lower area in the direction of gravity below the straight line L1 of connecting the first support location A1 with the second support location A2 on the stacking surface of the unit cell ensures the similar advantageous effects.

In the above description, the engagement elements 28 are in face contact with the guide members 52. This is, however, not restrictive and another configuration may be employed. For example, as shown in FIG. 16, the engagement elements 28 may be in point contact with the guide members 52. In the latter case, the support locations A1 and A2 denote contact points of the engagement elements 28 which are in contact with the guide members 52 on the stacking surface of the unit cell 10.

In the above description, the support locations A1 and A2 denote the locations nearest to the center of gravity C in the respective supported areas of the engagement elements 28 which are to be supported by the guide members 52, on the stacking surface of the unit cell 10. The positional relation is then specified between the center of gravity C and the straight line L1 of connecting these support locations A1 and A2 with each other. This is, however, not restrictive and another arrangement may be employed. The arrangement of locating the center of gravity C in a lower area in the direction of gravity below a straight line of connecting an arbitrary point in an area of the first engagement element 28 allowed to be in contact with the first guide member 52 with an arbitrary point in an area of the second engagement element 28 allowed to be in contact with the second guide member 52, on the stacking surface of the unit cell 10 ensures the similar advantageous effects. The area on the inner surface of the first engagement element 28 to be supported by the guide member 52 corresponds to the "first support area" described in Summary, and the area on the inner surface of the second engagement element 28 to be supported by the guide member 52 corresponds to the "second support area" described in Summary.

Modification 3 (Modification with Regard to Shapes of Engagement Elements and Guide Members and Stacking Operation)

Figure 21:
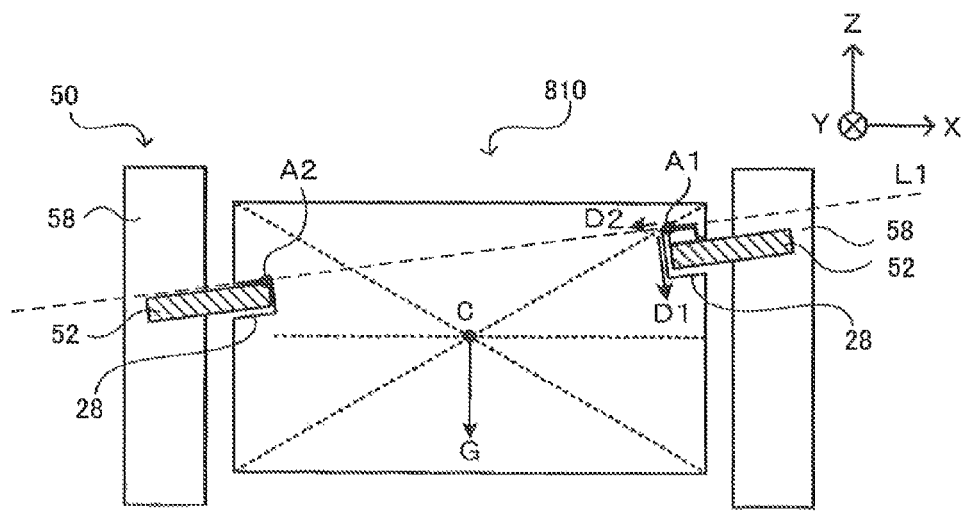
FIG. 21 is a diagram illustrating a modification with regard to the shapes of engagement elements and guide members and the stacking operation.

FIG. 21 is a diagram illustrating a modification with regard to the shapes of engagement elements and guide members and the stacking operation. FIG. 21 is a front view illustrating a unit cell 810 engaged by guide members 52 of a manufacturing apparatus 50, which is similar to the manufacturing apparatus 50 shown in FIG. 3. The like components of FIG. 21 to those of FIG. 3 are expressed by the like reference numbers and are not specifically described herein.

As in the modification of FIG. 20, in the modification of FIG. 21, the center of gravity C is located in a lower area in the direction of gravity below a straight line L1 of connecting a first support location A1 with a second support location A1, and the first and the second support locations A1 and A2 are arranged to be away from each other across the center of gravity C in the horizontal direction. Additionally, in the unit cell 810 of FIG. 21, both first and second support areas of the first and second engagement elements 28 which are areas supportable by the guide members 52 and first and second contact areas of the first and second guide members 52 which are areas allowed to be in contact with the first and second engagement elements 28 form sloped surfaces.

Figure 22:
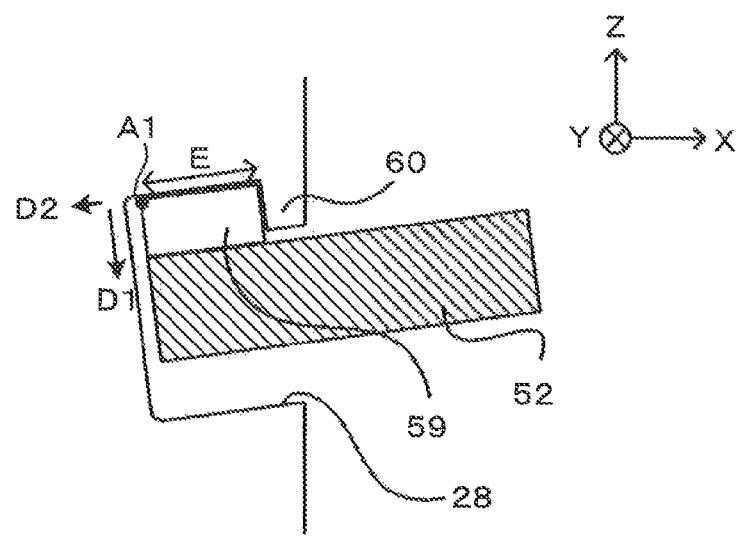
FIG. 22 is a diagram illustrating the state of engagement of a first engagement element with a first guide member.

FIG. 22 is an enlarged view illustrating the state that the first engagement element 28 is engaged with the first guide member 52. In the unit cell 810 of Modification 3, the first engagement element 28 has a first positioning element 60. The first engagement element 28 is formed in concave shape that is open at the side of the unit cell 10 parallel to the direction of gravity. The first positioning element 60 is formed in a shape protruded downward in the direction of gravity at the opening of the first engagement element 28. The first guide member 52 has a convexity 59 formed at an end thereof. In the configuration of Modification 3, an upper surface of the convexity 59 in the direction of gravity comes into contact with the first engagement element 28, so that the first guide member 52 supports the unit cell 810 upward in the direction of gravity. In FIG. 22, an area defined by a range E on the inner surface of the first engagement element 28 corresponds to the "first support area" described in Summary, and an area defined by the range E on the surface of the convexity 59 corresponds to the "first contact area" described in Summary. As shown in FIG. 21, the second guide member 52 is formed in a flat plate shape without convexity, like the embodiment described above.

In Modification 3, the contact surfaces between the first and the second engagement elements 28 and the first and the second guide members 52, i.e., the first and second support areas of the engagement elements 28 and the first and the second contact areas of the guide members 52, form sloped surfaces that are inclined downward in the direction of gravity from the first engagement element side toward the second engagement element side. The first and the second support areas and the first and the second contact areas form the sloped surfaces having the same angles of inclination with respect to the horizontal plane. In the illustrated example of FIG. 21, the first and the second support areas and the first and the second contact areas form one identical sloped surface. The first support area and the first contact area may, however, form a different sloped surface from a sloped surface formed by the second support area and the second contact area, as long as the sloped surfaces are parallel to each other. The sloped surfaces having the same angle of inclination or the sloped surfaces parallel to each other denote the sloped surfaces having a difference of not greater than 5 degrees in angle with respect to the horizontal plane.

As described above, inclination of the contact surfaces between the first and the second engagement elements 28 and the first and the second guide members 52 apply the force of moving the unit cell 810 from the first engagement element side toward the second engagement element side along the first and the second contact areas of the guide members 52 in the course of engagement of the unit cell 810 by the guide members 52. FIG. 21 shows force components D1 and D2 as components of the gravity G. The force component D2 parallel to the first and the second contact areas of the guide members 52 acts as the force of moving the unit cell 810 as described above.

The first engagement element 28 has the first positioning element 60 that comes into contact with the surface perpendicular to the first contact area of the convexity 59 as described above (FIG. 22). In the process of stacking the unit cells 810, engagement of the first positioning element 60 with the convexity 59 stops the move of the unit cell 810 along the first and the second contact areas of the guide members 52.

As described above, in the configuration of Modification 3, the first and the second support areas of the engagement elements 28 and the first and the second contact areas of the guide members 52 are arranged to form the inclined surfaces, and the first positioning element 60 for locking the unit cell 810 is provided on the first engagement element 28. This configuration has the advantageous effect of enhancing the accuracy of positioning in the horizontal direction (X direction) in the course of stacking the unit cells 810, in addition to the similar advantageous effects to those of the embodiment described above.

In Modification 3, in the state that the struts for holding the guide members 52 in the guide sections 58 of the manufacturing apparatus 50 and the two opposed sides of the unit cell 810 which the pair of engagement elements 28 are respectively open to are kept parallel to the direction of gravity, the support areas of the engagement elements 28 and the contact areas of the guide members 52 are inclined. There is accordingly no need to incline the entire manufacturing apparatus 50. This enhances the accuracy of positioning of the unit cell 810 in the horizontal direction, while suppressing the complexity of the configuration of the manufacturing apparatus 50.

The angle of inclination may be set adequately by taking into account, for example, the magnitude of resistance (frictional force) between the engagement elements 28 and the guide members 52, such that the unit cell 810 is moved downward in the direction of gravity to allow for positioning at the first positioning element 60. The angle of inclination of the sloped surface with respect to the horizontal plane is preferably not less than 3 degrees and is more preferably not less than 4 degrees. As described above, the manufacturing apparatus 50 may be provided with the vibration generator 53 for vibrating the guide members 52. In this configuration, even the smaller angle of inclination facilitates moving the unit cell 810 to the desired position. The sloped surface having the greater angle of inclination with respect to the horizontal direction enhances the effect of positioning by pressing the gas separator downward in the direction of gravity.

Figure 23:
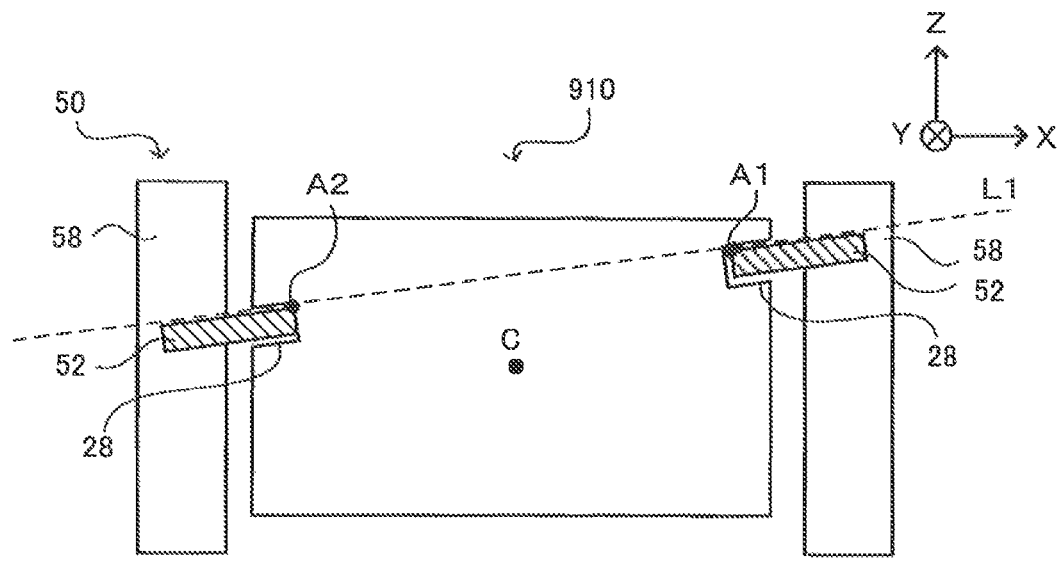
FIG. 23 is a diagram illustrating a modified configuration for positioning in the horizontal direction on a second engagement element side.

FIG. 23 is a diagram illustrating a modified configuration for positioning in the horizontal direction on the second engagement 28-side as another example of Modification 3. In the illustrated example of FIG. 23, the first guide member 52 does not have the convexity 59. In the first guide member 52 and the second guide member 52, the contact areas for supporting the engagement elements 28 form the same sloped surfaces having the same angle of inclination. In the configuration of FIG. 23, a unit cell 910 moves along the sloped surfaces until an end of the second guide member 52 (end nearest to the center of gravity C in the horizontal direction) abuts against the inner wall surface of the second engagement element 28. This configuration has the similar advantageous effect of enhancing the accuracy of positioning in the horizontal direction (X direction) in the course of stacking the unit cells 910.

With respect to positioning of the unit cell in the horizontal direction, as shown in FIGS. 21 and 22, the configuration of positioning on the first engagement element side provided at the upper position in the direction of gravity is more desirable than the configuration of positioning on the second engagement element side provided at the lower position in the direction of gravity. This is because the configuration of positioning on the first engagement element side has the enhanced effect of keeping the stacking surfaces of the respective unit cells parallel to one another in the course of stacking the unit cells.

Figure 24A:
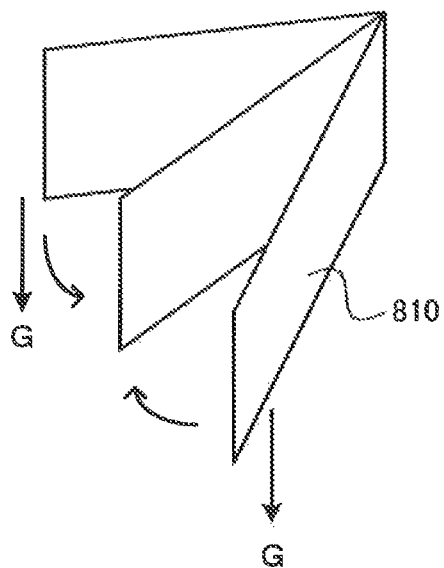
FIGS. 24A and 24B are diagrams illustrating the difference between forces applied to unit cells to be stacked according to different positioning locations.
Figure 24B:
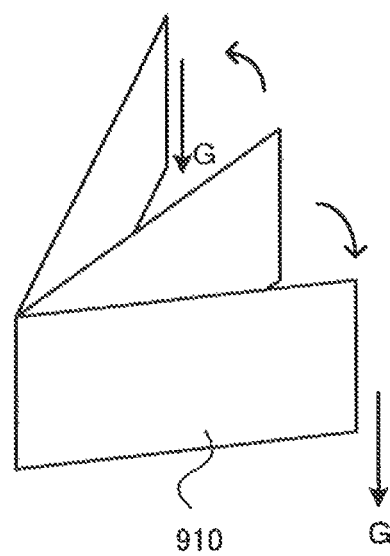

FIGS. 24A and 24B are diagrams illustrating the difference between forces applied to unit cells to be stacked according to different positioning locations. FIG. 24A illustrates the configuration of positioning on the first engagement element side provided at the upper position in the direction of gravity, and FIG. 24B illustrates the configuration of positioning on the second engagement element side provided at the lower position in the direction of gravity. As shown in FIG. 24A, in the state that the unit cells 810 are supported at the upper position in the direction of gravity, the gravity acts in the direction of compensating for a lilt caused on the stacking surfaces of the unit cells 810. As shown in FIG. 24B, on the other hand, in the state that the unit cells 910 are supported at the lower position in the direction of gravity, the gravity may act in the direction of increasing a tilt caused on the stacking surfaces of the unit cells 910.

Figure 25:
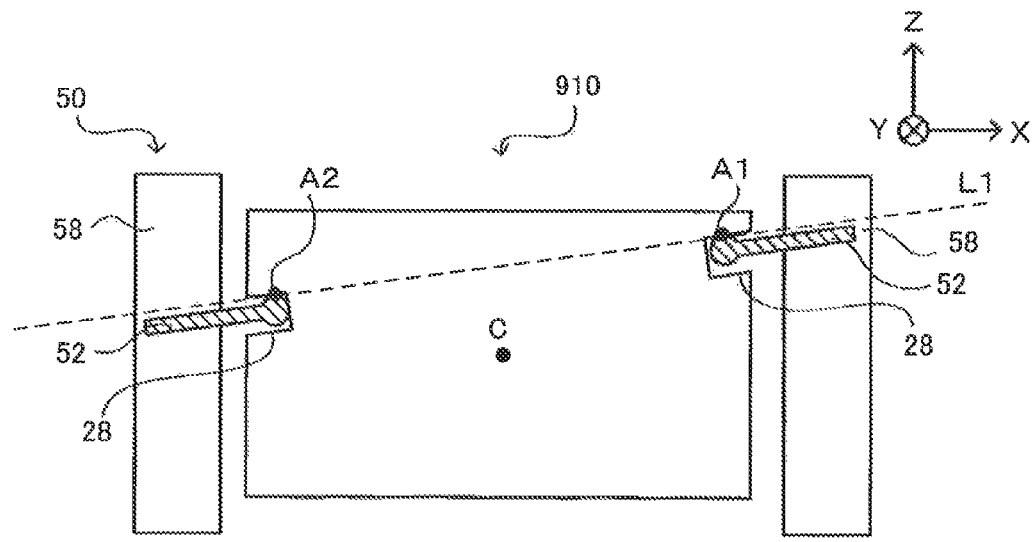
FIG. 25 is a diagram illustrating another modified configuration where guide members are in point contact with engagement elements.

FIG. 25 is a diagram illustrating another modified configuration where the engagement elements 28 are in point contact with the guide members 52 as yet another example of Modification 3. In the illustrated example of FIG. 25, the support areas of the first and the second engagement elements 28 supportable by the first and the second guide members 52 form the same sloped surfaces as those of FIG. 21, but the first engagement element 28 does not have the first positioning element 60. The first and the second guide members 52 have curved portions of an approximately circular cross section in the stacking direction, like the structure of FIG. 16.

This modified configuration has the similar advantageous effects to those of FIGS. 21 to 23. On the contrary to the configuration of FIG. 25, the first and the second contact areas of the guide members allowed to be in contact with the first and the second engagement elements may be arranged to form sloped surfaces, and the first and the second support areas of the engagement elements may be formed in a different shape from the sloped surface. In the latter case, for example, the sloped surfaces of the guide members may be arranged to be in point contact with the first and the second engagement elements in the concave/convex shape of the unit cell. The configuration that at least either the first and the second support areas of the engagement elements or the first and the second contact areas of the guide members form the sloped surfaces such as to allow the unit cell to be moved along the sloped surfaces downward in the direction of gravity ensures the similar advantageous effects.

Modification 4 (Modification with Regard to Positioning in Horizontal Direction)

Figure 26:
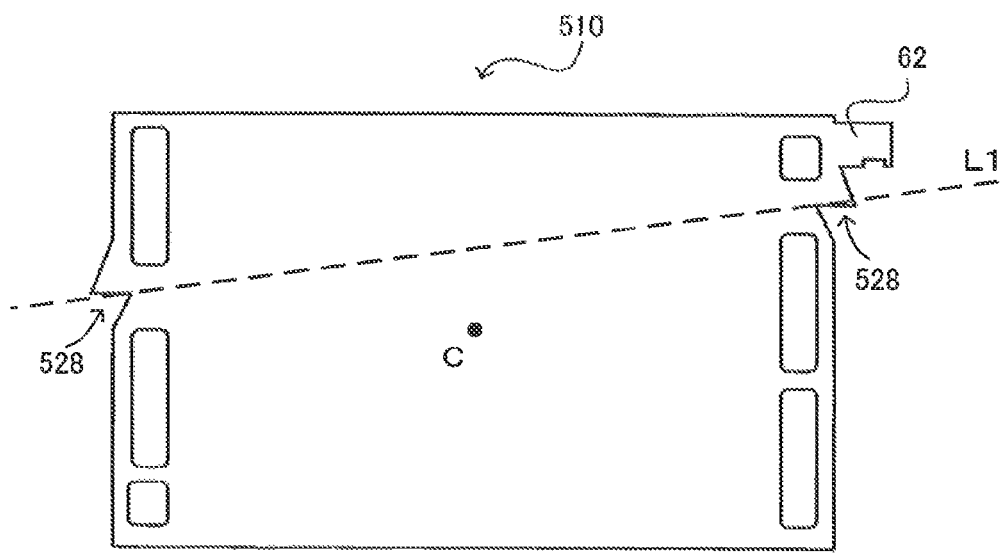
FIG. 26 is a diagram illustrating a modification with regard to the structure for positioning in the horizontal direction.

FIG. 26 is a diagram illustrating a modification with regard to positioning in the horizontal direction. A unit cell 510 shown in FIG. 26 has a second positioning element 62, in addition to engagement elements 528 in the same shape as those of the unit cell 510 shown in FIG. 15. Unlike Modification 3, modification 4 has a structure for positioning the unit cell in the horizontal direction as the separate structure from the engagement elements.

The second positioning element 62 may have any shape and may be thrilled at any location as long as the second positioning element 62 is engaged with a specified location in the manufacturing apparatus 50 in the course of stacking the unit cells to position the unit cell in the horizontal direction. The second positioning element 62 may not be newly provided only for the purpose of positioning in the horizontal direction but may be the concave/convex shape formed on the outer circumference of the unit cell for any other purpose. For example, a structure for fastening the wiring for as sensor used to detect the output state of the fuel cell such as voltage (cell monitor) may be used as the second positioning element 62 in the course of stacking the unit cells. This suppresses the complexity of the structure of the unit cell for positioning the unit cell in the horizontal direction. The shape of the engagement element is not limited to the shape of the engagement elements 528 shown in FIG. 15 but may be any of the shapes of the engagement elements formed in the unit cells of the embodiment and Modification 1 described above. This modified configuration also has the advantageous effect of enhancing the accuracy of positioning in the horizontal direction in the course of stacking the unit cells, in addition to the similar advantageous effects of the embodiment described above.

Modification 5 (Modification of Gas Separators and Unit Cells)

The shape of the gas separators and the configuration of the unit cells may be modified in various ways. For example, the gas separator may have any different shape and arrangement of the concaves and convexes forming the inner-cell gas flow paths and the coolant flow paths and the holes forming the manifolds from those of the above embodiment. The materials of the respective members constituting the unit cell 10 and the sealing structure provided in the unit cell 10 may also be modified in various ways. The unit cells 10 may be fuel cells other than solid electrolyte fuel cells, for example, solid oxide fuel cells. Additionally, the unit cells (gas separators) may be in any suitable shape other than the approximately rectangular shape. The gas separator may be in any other shape which has a pair of engagement elements in a concavo/convex shape formed along the outer periphery of the gas separator and arranged above the center of gravity of the gas separator in the direction of gravity to be away from each other in the horizontal direction across the center of gravity of the gas separator and which allows the gas separators to be suspended parallel to the direction of gravity and stacked by these engagement elements.

Modification 6 (Modification with Regard to Stacking Unit)

The unit of stacking is the unit cell 10 in the above embodiment, but may be a different unit. The unit of stacking may be any member including at least one gas separator. For example, the unit of stacking may be a member including one gas separator and part of the power generation assembly 12. In another example, the unit of stacking may be a member assembled by positioning and integrating a plurality of unit cells in advance.

After the desired number of unit cells 10 are stacked and integrated, part of the side surface of the stacked body may be cut for removal of specific portions corresponding to the engagement elements. Especially in the configuration with the engagement elements in the convex shape, such cutting suppresses the fuel cell from being expanded in size by providing the engagement elements. In the configuration with the engagement elements in the concave shape like the above embodiment, however, the stacked body is not expanded in size even without any special work.

The invention is not limited to any of the embodiments, the examples and the modifications described herein but may be implemented by a diversity of other configurations without departing from the scope of the invention. For example, the technical features of the embodiments, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

The invention claimed is:

1. A manufacturing method of a fuel cell by stacking a plurality of members including gas separators while sequentially engaging the gas separators with a guide section provided in a fuel cell manufacturing apparatus, wherein
the guide section comprises a first guide member and a second guide member arranged to be parallel to each other and away from each other in a horizontal direction and extended in a stacking direction of the plurality of members including the gas separator, which is perpendicular to the horizontal direction and a direction of gravity,
the gas separator has a first engagement element and a second engagement element provided at corresponding positions to the first guide member and the second guide member, each engagement element having a concave and/or convex shape formed along outer periphery of the gas separator,
the manufacturing method comprising:
a stacking step of suspending and stacking the plurality of members including the gas separators, such that stacking surfaces of the plurality of members are parallel to the direction of gravity, through engagement of the gas separators with the fuel cell manufacturing apparatus by engaging the first engagement element with the first guide member and engaging the second engagement element with the second guide member, wherein
the plurality of members stacked and suspended, such that the stacking surfaces of the plurality of members are parallel to the direction of gravity, by the stacking step satisfy such a configuration that a first support location of the first engagement element and a second support location of the second engagement element respectively supported by the first guide member and the second guide member are arranged at positions away from each other in the horizontal direction across a center of gravity of the gas separator in projection in the direction of gravity, and that the center of gravity is located in a lower area in the direction of gravity below a straight line of connecting the first support location with the second support location on a stacking surface of the gas separator, and
the first support location and the second support location have different distances in the direction of gravity from the center of gravity when the first engagement element and the second engagement element are respectively engaged with the first guide member and the second guide member.

2. The manufacturing method of the fuel cell according to claim 1,
wherein the first support location and the second support location are arranged above the center of gravity of the gas separator in the direction of gravity.

3. The manufacturing method of the fuel cell according to claim 1,
wherein the stacking step comprises:
arranging the first support location above the second support location in the direction of gravity; and
engaging the first engagement element with the first guide member and engaging the second engagement element with the second guide member, such that at least either a first support area of the first engagement element and a second support area of the second engagement element, which are areas supportable by the first guide member and the second guide member, or a first contact area of the first guide member and a second contact area of the second guide member, which are areas allowed to be in contact with the first engagement element and the second engagement element, form sloped surfaces that are inclined downward in the direction of gravity from a first engagement element side toward a second engagement element side.

4. The manufacturing method of the fuel cell according to claim 3,
wherein the stacking step comprises:
engaging the first engagement element with the first guide member and engaging the second engagement element with the second guide member, such that the gas separator is positioned relative to the first guide member at the first engagement element.

5. The manufacturing method of the fuel cell according to claim 1,
wherein the guide section comprises vibration generators configured to generate vibration in the first guide member and the second guide member, in order to suppress the first engagement element from being in close contact with the first guide member and suppress the second engagement element from being in close contact with the second guide member, and the stacking step is performed, while the vibration is generated in the guide members by the vibration generators.

\* \* \* \* \*